United States Patent
Wigren et al.

(10) Patent No.: US 10,728,867 B2
(45) Date of Patent: Jul. 28, 2020

(54) INTERVAL TIME CONTROL FOR 5G MULTI-CONNECTIVITY

(71) Applicant: Telefonaktiebolaget LM Ericsson (publ), Stockholm (SE)

(72) Inventors: Torbjörn Wigren, Uppsala (SE); Ramon Alejandro Delgado Pulgar, Elermore Vale (AU); Katrina Lau, Wallsend (AU); Richard Middleton, North Lambton (AU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 41 days.

(21) Appl. No.: 16/309,306

(22) PCT Filed: Jun. 23, 2016

(86) PCT No.: PCT/SE2016/050618
§ 371 (c)(1),
(2) Date: Dec. 12, 2018

(87) PCT Pub. No.: WO2017/222435
PCT Pub. Date: Dec. 28, 2017

(65) Prior Publication Data
US 2019/0313349 A1    Oct. 10, 2019

(51) Int. Cl.
*H04W 4/00*    (2018.01)
*H04W 56/00*    (2009.01)

(52) U.S. Cl.
CPC ......... *H04W 56/001* (2013.01); *H04W 56/00* (2013.01)

(58) Field of Classification Search
CPC ............................ H04W 56/00; H04W 56/001
(Continued)

(56) References Cited

U.S. PATENT DOCUMENTS 7,325,211 B1    1/2008 Bistry
8,001,204 B2    8/2011 Burtner et al.
(Continued)

FOREIGN PATENT DOCUMENTS

EP    2800429 A1    11/2014
EP    2822334 A1    1/2015
(Continued)

OTHER PUBLICATIONS

Wigren, T., "Robust L2 Stable Networked Control of Wireless Packet Queues in Delayed Internet Connections", IEEE Transactions on Control Systems Technology, Mar. 2, 2016, pp. 502-513, vol. 24, No. 2, IEEE.
(Continued)

*Primary Examiner* — Thai D Hoang
(74) *Attorney, Agent, or Firm* — Coats & Bennett, PLLC

(57) ABSTRACT

The solution presented herein controls a transmission timing of data from multiple transmission points to synchronize the data reception at a receiver to within pre-specified limits. To that end, a skew timing is determined from a difference between a second delay (a transmission time between the master node and a second slave node) and a first delay (a transmission time between a master node and a first slave node). A deadzone mapping is applied to the initial liming error (determined from a difference between a reference skew timing and the skew timing) to determine a final timing error. The deadzone mapping is configured to adjust the initial timing error responsive to a comparison between the initial timing error and a timing error range. The first and second delays are controlled using the final timing error to keep the skew timing within the timing error range.

15 Claims, 16 Drawing Sheets

(58) Field of Classification Search
USPC ............ 370/350, 503–520; 375/149, 240.28, 375/353–370
See application file for complete search history.

(56) References Cited

U.S. PATENT DOCUMENTS

| | | |
|---|---|---|
| 2010/0222068 A1 | 9/2010 | Gaal et al. |
| 2012/0307704 A1 | 12/2012 | Roman et al. |
| 2018/0220474 A1 | 8/2018 | Laselva |

FOREIGN PATENT DOCUMENTS

| | | | |
|---|---|---|---|
| GB | 2321829 A | 8/1998 | |
| WO | 2011075867 A1 | 6/2011 | |
| WO | 2013167647 A1 | 11/2013 | |
| WO | 2014207494 A1 | 12/2014 | |
| WO | 2016021903 A1 | 2/2016 | |
| WO | 2016144223 A1 | 9/2016 | |
| WO | 2017162270 A1 | 9/2017 | |
| WO | WO-2017162270 A1 * | 9/2017 | ............ H04W 24/10 |
| WO | WO-2017222435 A1 * | 12/2017 | .......... H04W 56/001 |
| WO | WO-2018004412 A1 * | 1/2018 | ......... H04L 43/0864 |

OTHER PUBLICATIONS

Middleton, R. et al., "Data Flow Delay Equalization for Feedback Control Applications Using 5G Wireless Dual Connectivity", 2017 IEEE 85th Vehicular Technology Conference (VTC Spring), Jun. 4, 2017, pp. 1-7, IEEE.

Sandberd, D. et al., "Multi-rate Uplink Channel Prediction and Enhanced Link Adaptation for VoLTE", 2015 IEEE 82nd Vehicular Technology Conference (VTC2015—Fall), Sep. 6-9 Sep. 6, 2015, pp. 1-5, IEEE.

* cited by examiner

INTERVAL TIME CONTROL FOR 5G MULTI-CONNECTIVITY

TECHNICAL FIELD

The solution presented herein relates generally to multi-node flow control, and more particularly to controlling the timing of the transmission of data by multiple nodes so as to control a timing skew between the timing paths as experienced by the receiver receiving the transmitted data.

BACKGROUND

Wireless systems have conventionally been designed to efficiently handle the transfer of data between a single network node, e.g., base station, and a single terminal, e.g., user equipment (UE), for standard communication frequencies, e.g., 1-2 GHz. The need for higher capacity, however, is resulting in a shift to higher carrier frequencies and/or transmissions by multiple network nodes, which is generally referred to as multi-point transmission.

The shift to higher carrier frequencies typically reduces the useful power experienced by the receiver. In particular, higher radio frequencies cause the radio propagation to transform from a diffuse scattering to a more beamlike propagation. The resulting sharp diffraction effects and increased radio shadowing (e.g., behind obstacles) makes it more difficult to achieve uniform coverage from a single base station. Multi-point transmissions, where data is transmitted from multiple non-co-located transmission points to a receiver, e.g., from multiple base stations to a single mobile station, may be used to provide more uniform coverage. Such multi-point transmissions may be used for various wireless systems, e.g., 4G and 5G systems.

Conventional multi-point systems typically involve a small number of transmission points, e.g., two transmission points. However, the higher frequencies and higher capacity requirements of newer systems are expected to require a large number of transmission points. Conventional systems and solutions, however, are unable to sufficiently control the synchronization errors, particularly those too large to be handled by existing protocols, and/or the large numbers of transmission points expected with such large multi-point systems. Thus, there remains a need for new ways to control multi-point systems.

SUMMARY

The solution presented herein controls a transmission timing of data from multiple transmission points to synchronize the data reception at a receiver such that the timing differences between transmit paths experienced in the receiver are all within pre-specified limits. In so doing, the solution presented herein provides improved multi-point control for any number of transmission points, which improves capacity. The solution presented herein discloses a timing control that is performed per bearer. However, it will be appreciated that the solution may also be applied to aggregates of bearers.

One exemplary embodiment comprises a method implemented in a master node of controlling a transmission timing for a plurality of slave nodes in a communication network. The method comprises determining a skew timing $T_{skew}$ from a difference between a second delay $T_{second}$ and a first delay $T_{first}$. The first delay $T_{first}$ represents a transmission time between the master node and a first slave node, and the second delay $T_{second}$ represents a transmission time between the master node and a second slave node. The method further comprises determining an initial timing error $x_{init}$ from a difference between a reference skew timing $T_{skew}^{ref}$ and the skew timing $T_{skew}$, and applying a deadzone mapping to the initial timing error $x_{init}$ to determine a final timing error $x_{final}$. The deadzone mapping is configured to adjust the initial timing error $x_{init}$ responsive to a comparison between the initial timing error $x_{init}$ and a timing error range, where the timing error range includes an upper limit $u_{max}$ and a lower limit $u_{min}$ used to bound the timing error range. The method further comprises controlling the first delay $T_{first}$ and the second delay $T_{second}$ using the final timing error $x_{final}$ to keep the skew timing $T_{skew}$ within the timing error range. In one exemplary embodiment, applying the deadzone mapping to the initial timing error ($x_{init}$) to determine the final timing error ($x_{final}$) comprises comparing the initial timing error $x_{init}$ to at least one of the upper and lower limits of the timing error range. If the initial timing error $x_{init}$ is within the timing error range, the method comprises setting the final timing error $x_{final}$ to zero. If the initial timing error $x_{init}$ is outside the timing error range, the method comprises determining the final timing error $x_{final}$ using the initial timing error $x_{init}$ and one of the upper and lower limits. In one exemplary embodiment, each slave node connects to the master node via an inner feedback loop and an outer feedback loop, where the method further comprises controlling a stability of the inner and outer feedback loops according to a Popov criterion.

One exemplary embodiment comprises a master node in communication with a plurality of slave nodes of a communication network. The master node comprises a first combiner circuit, a second combiner circuit, a deadzone mapping circuit, and an outer loop control circuit. The first combiner circuit is configured to determine a skew timing $T_{skew}$ from a difference between a second delay $T_{second}$ and a first delay $T_{first}$. The first delay $T_{first}$ represents a transmission time between the master node and a first slave node, and the second delay $T_{second}$ represents a transmission time between the master node and a second slave node. The second combiner circuit is configured to determine an initial timing error $x_{init}$ from a difference between a reference skew timing $T_{skew}^{ref}$ and the skew timing $T_{skew}$. The deadzone mapping circuit configured to adjust the initial timing error $x_{init}$ to determine a final timing error $x_{final}$ responsive to a comparison between the initial timing error $x_{init}$ and a timing error range. The timing error range includes an upper limit ($u_{max}$) and a lower limit ($u_{min}$) used to bound the timing error range. The outer loop control circuit is configured to control the first delay $T_{first}$ and the second delay $T_{second}$ using the final timing error $x_{final}$ to keep the skew timing $T_{skew}$ within the timing error range. The deadzone mapping circuit is configured to determine the final timing error $x_{final}$ by comparing the initial timing error $x_{init}$ to at least one of the upper and lower limits of the timing error range. If the initial timing error $x_{init}$ is within the timing error range, the deadzone mapping circuit sets the final timing error $x_{final}$ to zero. If the initial timing error $x_{init}$ is outside the timing error range, the deadzone mapping circuit determines the final timing error $x_{final}$ using the initial timing error $x_{init}$ and one of the upper and lower limits. In one exemplary embodiment, each slave node connects to the master node via an inner feedback loop and an outer feedback loop, where the master node is further configured to control a stability of the inner and outer feedback loops according to a Popov criterion.

One exemplary embodiment comprises a master node in communication with a plurality of slave nodes of a communication network. The master node comprises a first combiner module, a second combiner module, a deadzone mapping module, and an outer loop control module. The first combiner module is configured to determine a skew timing $T_{skew}$ from a difference between a second delay $T_{second}$ and a first delay $T_{first}$. The first delay $T_{first}$ represents a transmission time between the master node and a first slave node, and the second delay $T_{second}$ represents a transmission time between the master node and a second slave node. The second combiner module is configured to determine an initial timing error $x_{init}$ from a difference between a reference skew timing $T_{skew}^{ref}$ and the skew timing $T_{skew}$. The deadzone mapping module configured to adjust the initial timing error $x_{init}$ to determine a final timing error $x_{final}$ responsive to a comparison between the initial timing error $x_{init}$ and a timing error range. The timing error range includes an upper limit ($u_{max}$) and a lower limit ($u_{min}$) used to bound the timing error range. The outer loop control module is configured to control the first delay $T_{first}$ and the second delay $T_{second}$ using the final timing error $x_{final}$ to keep the skew timing $T_{skew}$ within the timing error range. In one exemplary embodiment, the deadzone mapping module is configured to determine the final timing error $x_{final}$ by comparing the initial timing error $x_{init}$ to at least one of the upper and lower limits of the timing error range. If the initial timing error $x_{init}$ is within the timing error range, the deadzone mapping module sets the final timing error $x_{final}$ to zero. If the initial timing error $x_{init}$ is outside the timing error range, the deadzone mapping module determines the final timing error $x_{final}$ using the initial timing error $x_{init}$ and one of the upper and lower limits. In one exemplary embodiment, each slave node connects to the master node via an inner feedback loop and an outer feedback loop, where the master node is further configured to control a stability of the inner and outer feedback loops according to a Popov criterion.

One exemplary embodiment comprises a computer program product stored in a non-transitory computer readable medium for controlling a transmission timing for a plurality of slave nodes in a communication network, the computer program product comprising software instructions which, when run on a processing circuit in the master node, causes the processing circuit to determine a skew timing $T_{skew}$ from a difference between a second delay $T_{second}$ and a first delay $T_{first}$. The first delay $T_{first}$ represents a transmission time between the master node and a first slave node, and the second delay $T_{second}$ represents a transmission time between the master node and a second slave node. The software instructions further cause the processing circuit to determine an initial timing error $x_{init}$ from a difference between a reference skew timing $T_{skew}^{ref}$ and the skew timing $T_{skew}$, and apply a deadzone mapping to the initial timing error $x_{init}$ to determine a final timing error $x_{final}$. The deadzone mapping is configured to adjust the initial timing error $x_{init}$ responsive to a comparison between the initial timing error $x_{init}$ and a timing error range, where the timing error range includes an upper limit $u_{max}$ and a lower limit $u_{min}$ used to bound the timing error range. The software instructions further cause the processing circuit to control the first delay $T_{first}$ and the second delay $T_{second}$ using the final timing error $x_{final}$ to keep the skew timing $T_{skew}$ within the timing error range. In one exemplary embodiment, each slave node connects to the master node via an inner feedback loop and an outer feedback loop, where the software instructions further cause the processing circuit to control a stability of the inner and outer feedback loops according to a Popov criterion.

By using interval time difference flow control (e.g., via the deadzone mapper), the solution presented herein provides improved 5G multipoint flow control. In particular, the solution presented herein reduces end-to-end latency for selected traffic types, and thus enhances capacity, and guarantees the stability of the feedback control system.

DETAILED DESCRIPTION

The solution presented herein solves numerous problems associated with the synchronization of data transmitted in multi-point transmission systems, particularly those with a large number of transmission points. Before the details of this solution are described, the following first provides some basic information regarding multi-point transmissions and the associated systems.

In massive multi-point transmission systems, such as those expected for 5G systems, where a receiver receives data transmitted by a large number of transmission points, each involved transmission point needs to be given access to all or portions of this data, for transmission over the wireless interface. It should here be noted that the different transmission points may transmit different data, the same data for diversity gain, or a mix of these alternatives. In many applications data from some transmission points may be closely related to data simultaneously being transmitted from other transmission points, e.g., when the data is video data. In this case, the receiving device, e.g., the UE, needs to receive all of the data transmitted from different transmission points for a specific part of the video at the same time (e.g., to within a certain pre-determined margin of error).

Figure 1:
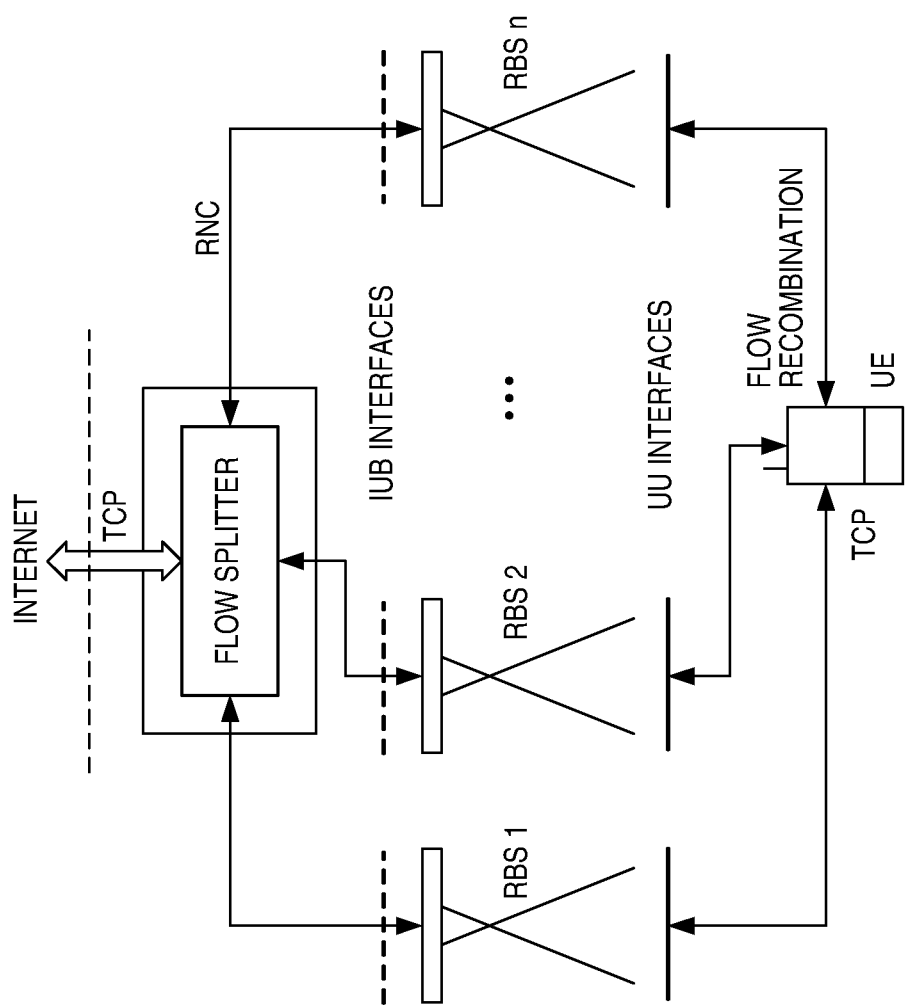
FIG. 1 shows an exemplary multi-point transmission system.

FIG. 1 shows an exemplary multi-point transmission system in terms of a 3G Wideband Code Division Multiple Access (WCDMA) system. Similar architectures in 4G and 5G could involve nodes from both the radio access network (RAN) and the core network (CN). The following explains the terminology used with respect to the operation of such a multi-point transmission system.

First, a number of representations of a dynamic process is introduced. A dynamic process is one where the output has memory, and therefore depends not only on the present input signal but also on previous inputs and outputs. The most basic dynamic process is a linear one, which may be described by a differential equation as:

$$y^{(N)}(t) \pm a_1 y^{(N-1)}(t) + \ldots + a_N = b_0 u^{(M)}(t) \ldots b_M^+(t+), \quad (1)$$

where y (t) represents an output signal, u(t) represents an input signal, t represents time, $^{(N)}$ represents $N^{th}$ order differentiation with respect to time, and $a_k$ and $b_l$ represent constant parameters where k=1, ..., N and l=1, ..., M. Equation (1) is an $N^{th}$ order differential equation with one input signal and one output signal. For simplicity, the following explanation stems from this single input, single output equation, but it will be appreciated that the following may easily be extended to multiple inputs and/or multiple outputs by those skilled in the art.

Taking the Laplace transform of Equation (1) and setting initial values to zero produces the following transfer function H(s), where s represents the Laplace transform variable.

$$H(s) = \frac{B(s)}{A(s)} = \frac{b_0 s^M + b_1 s^{M-1} + \ldots + b_M}{s^N + a_1 s^{N-1} + \ldots + a_N} \quad (2)$$

The relationship between the output signal Laplace transform Y(s) and the input signal Laplace transform U (s) is therefore:

$$Y(s) = H(s)U(s), \quad (3)$$

where the poles ($p_k$ k=1, ..., N) for this process may be given by A(s)=0. In general, however, the poles are real or complex conjugate pairs. It will be appreciated that the properties of the dynamic process may also be studied in the frequency domain in terms of complex valued frequency functions Y (jω), H (jω), and U (jω), where ω represents the angular frequency that fulfills ω=2πf, and where f represents the frequency in Hz.

Figure 2:
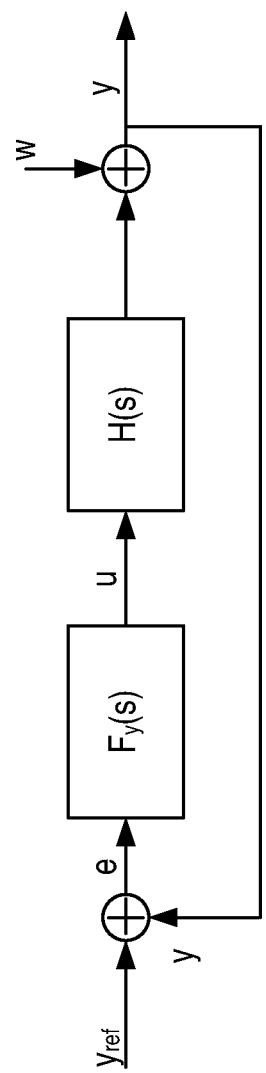
FIG. 2 shows a general block diagram for a closed-loop control system.

FIG. 2 shows a general block diagram for a closed-loop control system associated with Equation (3). In FIG. 2, $F_y$(s) represents a feedback gain and W (s) represents a disturbance, e.g., noise. The closed-loop system may then be represented by:

$$Y(s) = W(s) + H(s)F_y(s)(Y_{ref}(s) - Y(s)), \quad (4)$$

which results in:

$$Y(s) = \frac{F_y(s)H(s)}{1 + F_y(s)H(s)} Y_{ref}(s) + \frac{1}{1 + F_y(s)H(s)} W(s). \quad (5)$$

Equation (5) shows the effect of the reference signal $Y_{ref}$(s) and the disturbance W (s) on the output. The closed-loop bandwidth $\omega_{CL}$ of the control system may be represented by:

$$\left| \frac{F_y(j\omega_{CL})H(j\omega_{CL})}{1 + F_y(j\omega_{CL})H(j\omega_{CL})} \right|^2 = \frac{1}{2} \left| \frac{F_y(0)H(0)}{1 + F_y(0)H(0)} \right|^2. \quad (6)$$

The closed-loop static error of the control system may be given by:

$$y_{ref} - y = \frac{1}{1 + F_y(0)H(0)}(y_{ref} - w). \quad (7)$$

The static disturbance rejection of the control system may be given by the static sensitivity function:

$$S(0) = \frac{1}{1 + F_y(0)H(0)}, \quad (8)$$

while the dynamic disturbance rejection of the control system may be given by the sensitivity function:

$$S(j\omega) = \frac{1}{1 + F_y(j\omega)H(j\omega)}. \quad (9)$$

The complementary sensitivity function of the control system, T (jω)=1 S(jω), determines the robustness of the control system with respect to un-modeled dynamics.

It will be appreciated that the discussion associated with FIGS. 1-2 and Equations (1)-(9) correspond to one transmission point of a multi-transmission point system, and the control of such a transmission point. It will be appreciated that the control of multi-transmission point systems increases in complexity as the number of transmission points increases.

One concern with multi-point transmission systems involves the synchronization of the received data at the receiver, e.g., at the UE. For example, in a best case scenario, the data received by the flow splitter of FIG. 1 will be an ordered set of packets that must be transmitted to the UE. Due to non-uniform and widely varying delays in the individual flows, the packets received by the UE will generally be out of order. Exemplary causes for such delay variations may include, but are not limited to, varying queueing delays in the base station, varying transport network delays (e.g., due to congestion), varying radio link quality (causing, e.g., different buffer sizes in different base stations), and/or the existence (or lack thereof) of retransmissions. It will be appreciated that because higher carrier frequencies, such as expected for 5G systems, result in an increased radio shadowing, handling such radio link variations becomes increasingly important for such systems.

Current multi-point transmission systems automatically handle small timing errors, e.g., by reordering the packets, to synchronize the received data. In some cases, however, the timing error is too large, and thus such reordering techniques are not sufficient. When the conventional reordering techniques are insufficient, conventional systems may register an error and request a retransmission of one or more packets. Such retransmission requests may cause the retransmission of out-of-sequence packets that have already been received, as well as the retransmission of packets still in flight. Such retransmission requests may therefore cause significant errors, and further aggravate the already problematic timing issues.

Another concern with multi-point transmission systems is the expected increase in the number of users, and thus the amount of data, for 5G systems as compared to current 4G systems. This large increase means the number of controller algorithm instances, such as described by Equations (1)-(9), will also increase. Such an increase could undesirably impact the complexity of the overall control system used to control the multi-point transmission system.

Yet another concern is that certain types of applications for 5G systems, e.g., robotic control over wireless, requires significantly less latency as compared to the current 4G systems. As a result, in order to time align data at the UE, the faster transmit paths need to wait for the slower ones, which means the worst connection path would be allowed to dominate the better ones, a fact that is not advantageous for capacity, stability, and performance in general.

For at least these reasons, it is clear that new solutions for multi-point transmission systems are needed.

The solution presented herein provides control for a multi-point transmission system to synchronize data reception at the UE for any number of transmission points. To that end, the solution presented herein controls the transmit timing skew of multiple transmit nodes so that the transmit timing skew falls within a timing error range, which in some embodiments may comprise a predetermined timing error range. To simplify the discussion, the following describes the solution presented herein in terms of multiple transmit nodes comprising a master node and a plurality of slave nodes. While the terms "master" node and "slave" node as used herein can represent those nodes traditionally referred to as a master node and a slave node, it will be appreciated by those skilled in the art that, as used herein, the term "master node" represents the entity in the communication network that provides the master control function for the associated slave nodes and the equipment associated with the timing control solution presented herein, and the term "slave node" represents the entity in the communication network that provides the slave control function and equipment associated with the timing control solution presented herein. Thus, while the master node referred to herein may reside in a serving cell base station, such is not required. Further, while each master and slave node may reside in a different network node, it will be appreciated that such is not required. In some embodiments, for example, the master node and at least one slave node may both be comprised in a radio base station. In general, the solution presented herein assumes each slave node represents one transmission point of the multi-point transmission system.

Figure 3:
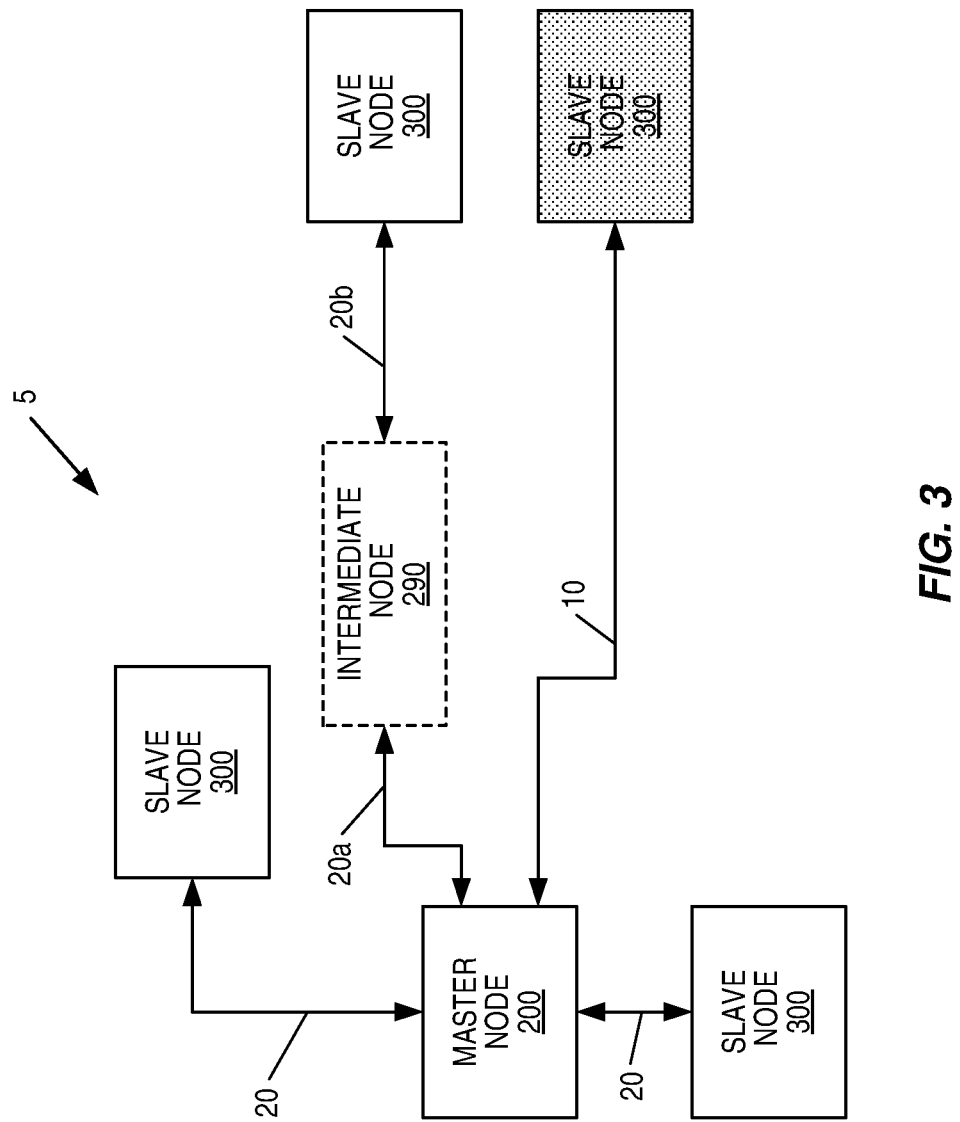
FIG. 3 shows a block diagram for a multi-point transmission system according to one exemplary embodiment.

FIG. 3 shows an exemplary multi-point communication system 5 comprising a master node 200 and a plurality of slave nodes 300, where the shaded slave node 300 represents a reference slave node 300, generally referred to herein as a first slave node 300. It will be appreciated that any node designated as a "slave node" may be used as the first slave node 300. The slave nodes 300 each represent a transmission point of a multi-transmission point system, and thus each slave node 300 transmits wireless data to a wireless receiver, e.g., the UE of FIG. 1. The master node 200 communicates with the first slave node 300 via one communication channel 10, e.g., one backhaul channel, while the master node 200 communicates with the remaining slave nodes 300 via other individual communication channels 20. It will be appreciated that the communication channels 10, 20 between the master node 200 and the slave nodes 300 may comprise wireless and/or wired backhaul communication channels. Further, as shown in FIG. 3, the master 200 may communicate directly with one or more of the slave nodes 300, or may communicate with one or more of the slave nodes 300 via an intermediate node 290, where the communication channel 20a is between the master node 200 and the intermediate node 290 and the communication channel 20b is between the intermediate node 290 and the slave node 300. When an intermediate node 290 is used to facilitate the communications between the master and slave nodes 200, 300, the intermediate node 290 conveys the information discussed further below from the slave node 300 (or from the master node 200) to the master node 200 (or to the slave node 300.

Figure 4:
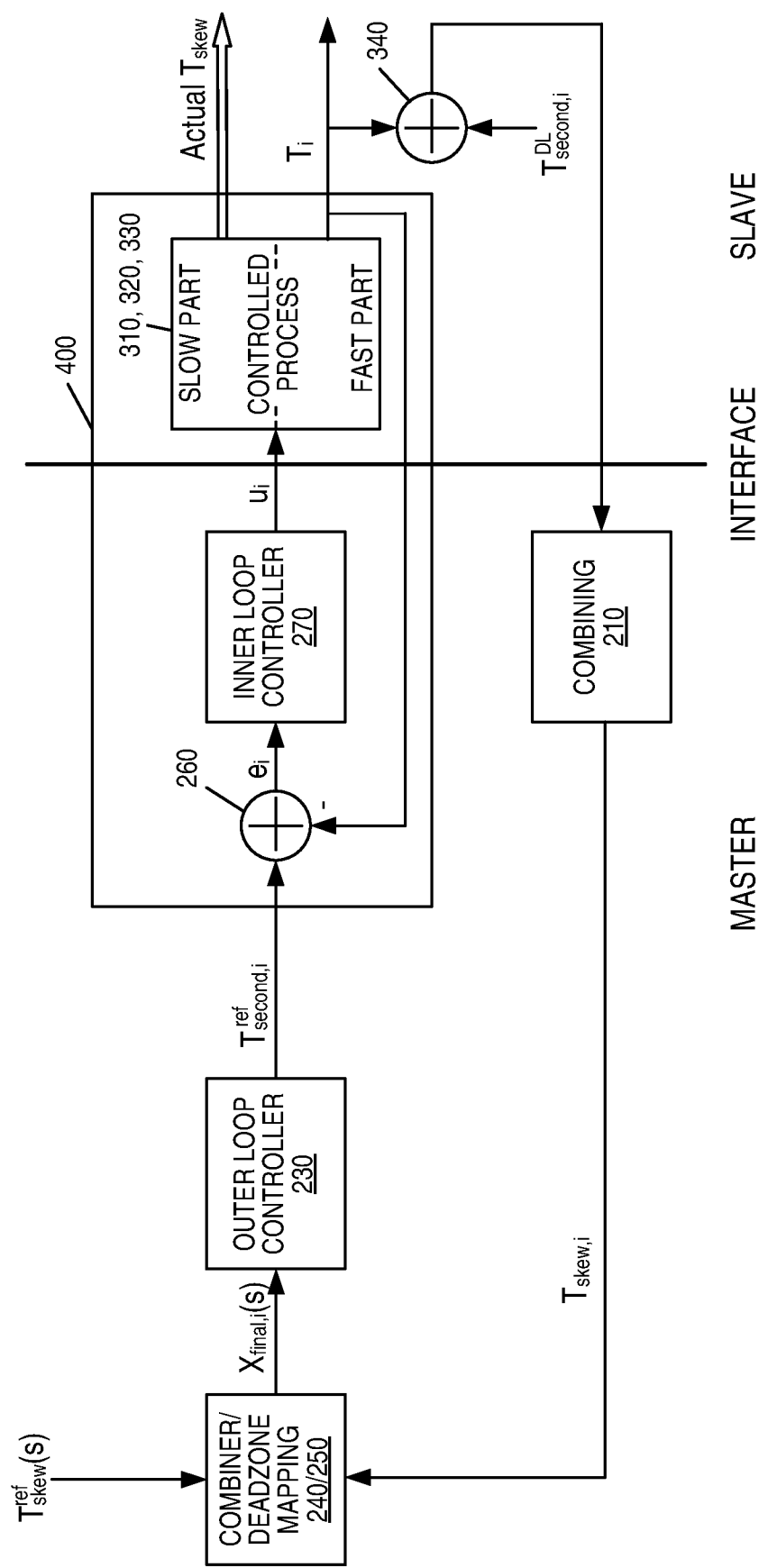
FIG. 4 shows a block diagram for the inner loop control between the master and slave nodes according to one exemplary embodiment.

To substantially synchronize the reception of transmissions from each slave node 300 at a receiver, and thus to address many of the problems associated with conventional multi-point systems, the solution presented herein uses two feedback loops between the master and slave nodes 200, 300: an inner feedback loop and an outer feedback loop, as shown in FIG. 4. The master and slave nodes 200, 300 use these feedback loops to control the timing skew associated with data transmissions from each of the slave nodes 300, as discussed further herein with respect to FIGS. 5-9. Generally speaking, the inner feedback loop 400 provides the actual timing skew and provides measured data to the outer feedback loop, and the outer feedback loop uses the provided measured data to control the actual timing skew of each slave node. As shown in FIG. 4, which shows a general and basic block diagram of the interactions between one master node 200 and one slave node 300, inner feedback loop 400 is part of both the master and slave nodes 200, 300. For example, the inner feedback loop 400 comprises a combiner 260 and inner loop controller 270 in the master node 200, and the interface 310, transmit queue 320, and processor 330 of the slave node 300 (FIG. 6). The general control shown by FIG. 4 extends to multiple transmission points as shown in FIG. 6. The inner feedback loop 400 operates according to known means and is provided herein only for completeness. In general, the slave node portion of the inner feedback loop 400 provides cascade control using a slow control process and a fast control process. The slow control process outputs the actual skew timing used by the slave node 300 for data transmission responsive to the inner loop control. The fast control process provides the first and second delays $T_{first}, T_{second}$ as discussed herein to facilitate the operation of the outer feedback loop and as controlled by the inner feedback loop 400. It will be appreciated that the inner feedback loop 400 may be represented by the transfer function $G_i^{inner}$ which may be given by:

$$G_i^{inner}(s) = \frac{b_0 s^M + \ldots + b_M}{s^N + \ldots + a_N} \quad (10)$$

where $a_k$ (k=1, ..., N) and $b_l$ (l=1, ..., M) represent the coefficients of the transfer function as explained above with respect to Equations (1) and (2), and where s represents the Laplace variable.

Figure 5:
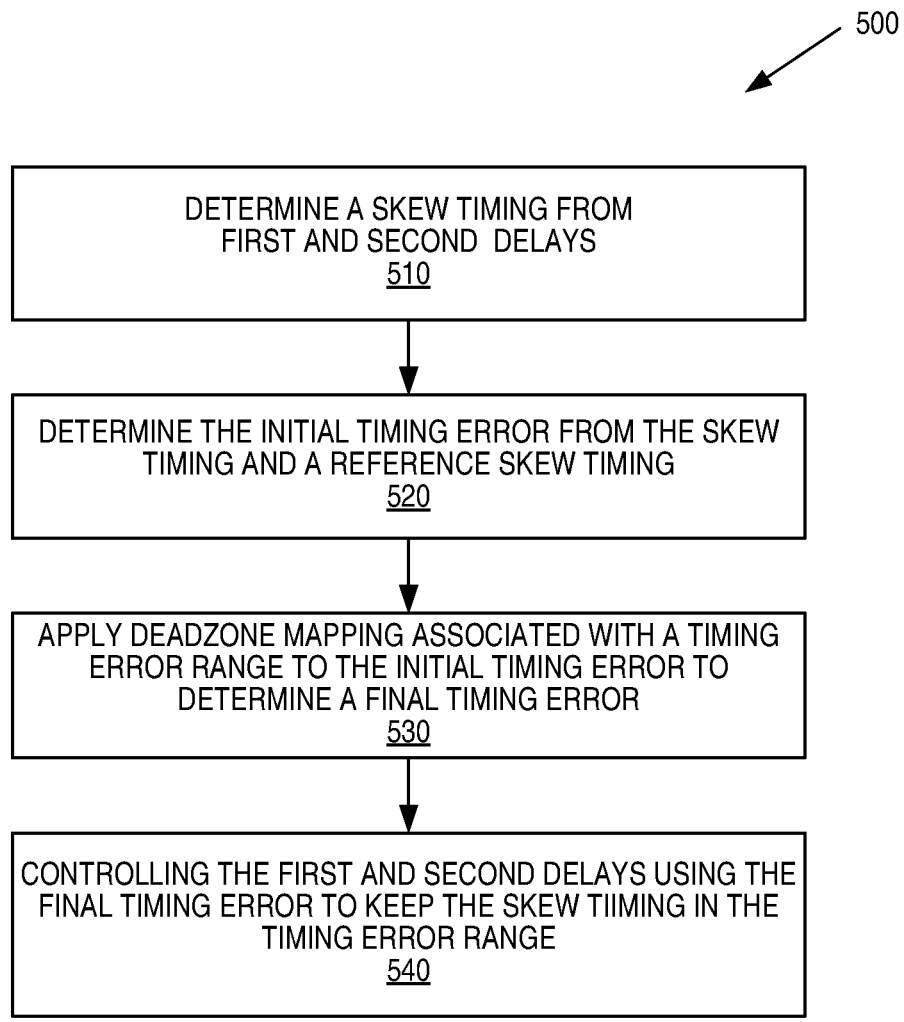
FIG. 5 shows a control method for the master node according to one exemplary embodiment.
Figure 6:
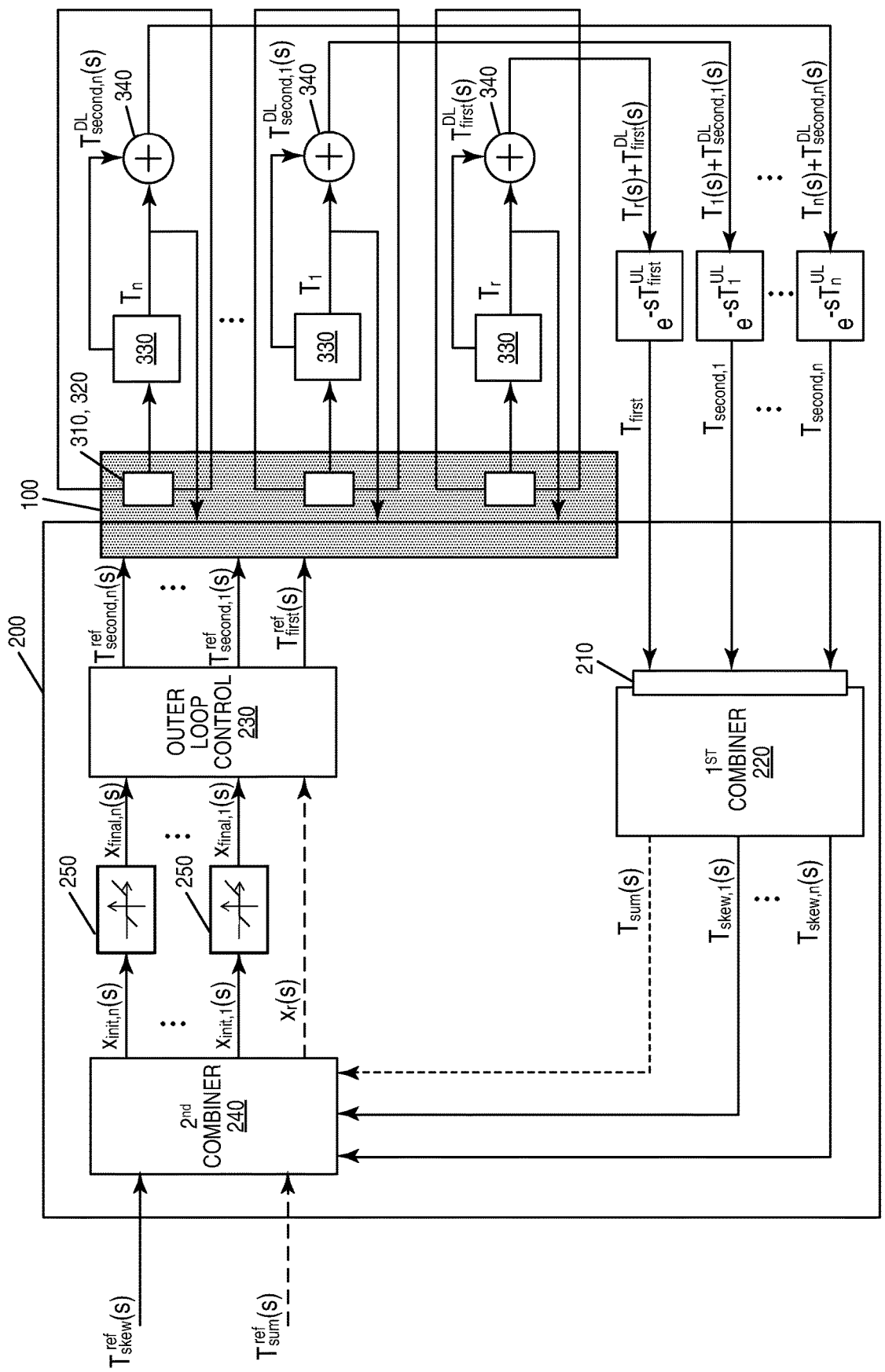
FIG. 6 shows a block diagram for the master and slave nodes of the multi-point transmission system according to one exemplary embodiment.

FIG. 5 shows an exemplary method 500 implemented by a master node 200 according to the solution presented herein. To control the transmission timing for a plurality of slave nodes 300, master node 200 determines a skew timing from first and second delays $T_{first}, T_{second}$ (block 510), and determines an initial timing error $x_{init}$ from a difference between a reference skew timing $T_{skew}^{ref}$ and the skew timing $T_{skew}$ (block 520). The master node 200 applies a deadzone mapping to the initial timing error $x_{init}$ to determine a final timing error $x_{final}$ (block 530). The deadzone mapping used by the master node 200 is configured to adjust the initial timing error $x_{init}$ responsive to a comparison between the initial timing error $x_{init}$ and a timing error range, where the timing error range includes an upper limit $u_{max}$ and a lower limit $u_{min}$ that bound the timing error range. The master node 200 controls the first delay $T_{first}$ and the second delay $T_{second}$ using the final timing error $x_{final}$ to keep the skew timing $T_{skew}$ within the timing error range [$u_{min}$,$u_{max}$] (block 540).

The timing error range [$u_{min}$,$u_{max}$] is configured to facilitate proper operation of the system of FIG. 6. It will be appreciated that different 5G services have different, and sometimes very different, requirements regarding the synchronization of the reception at the receiver of data packets transmitted over different paths. Thus, [$u_{min}$,$u_{max}$] may generally be configured as a result of the service represented by the particular bearer in question. For example, the upper and lower limits may be derived based on a length of a buffer of the wireless terminal being transmitted to by the slave nodes 300. The master node 200 may, for example, configure [$u_{min}$,$u_{max}$] using a table containing different timing error ranges for different circumstances. It will be appreciated that in one exemplary embodiment, the master node 200 stores and reads from such a table as appropriate. In another exemplary embodiment, another node in the network communicatively coupled to the master node may store and read from the table, and signal the desired [$u_{min}$,$u_{max}$] to the master node 200. It will be appreciated that the timing error range [$u_{min}$,$u_{max}$] may not be configured to be precisely equal to the desired error range interval. Rather, the timing error range [$u_{min}$,$u_{max}$] may be configured more conservatively to provide additional margin against end user time skew values that do not meet the specification.

Figure 7:
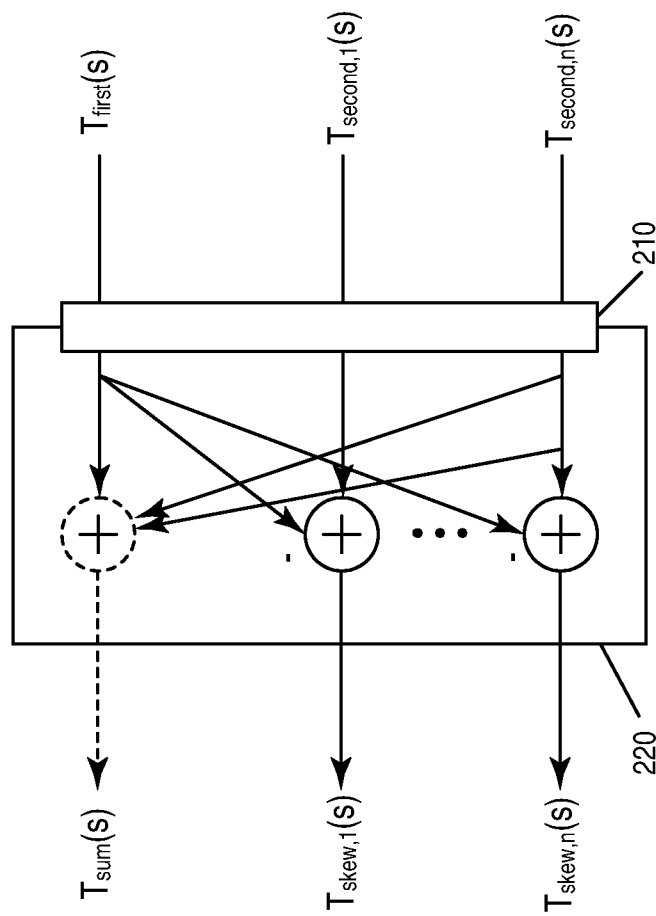
FIG. 7 shows a block diagram for the first combiner of the master node according to one exemplary embodiment.
Figure 8:
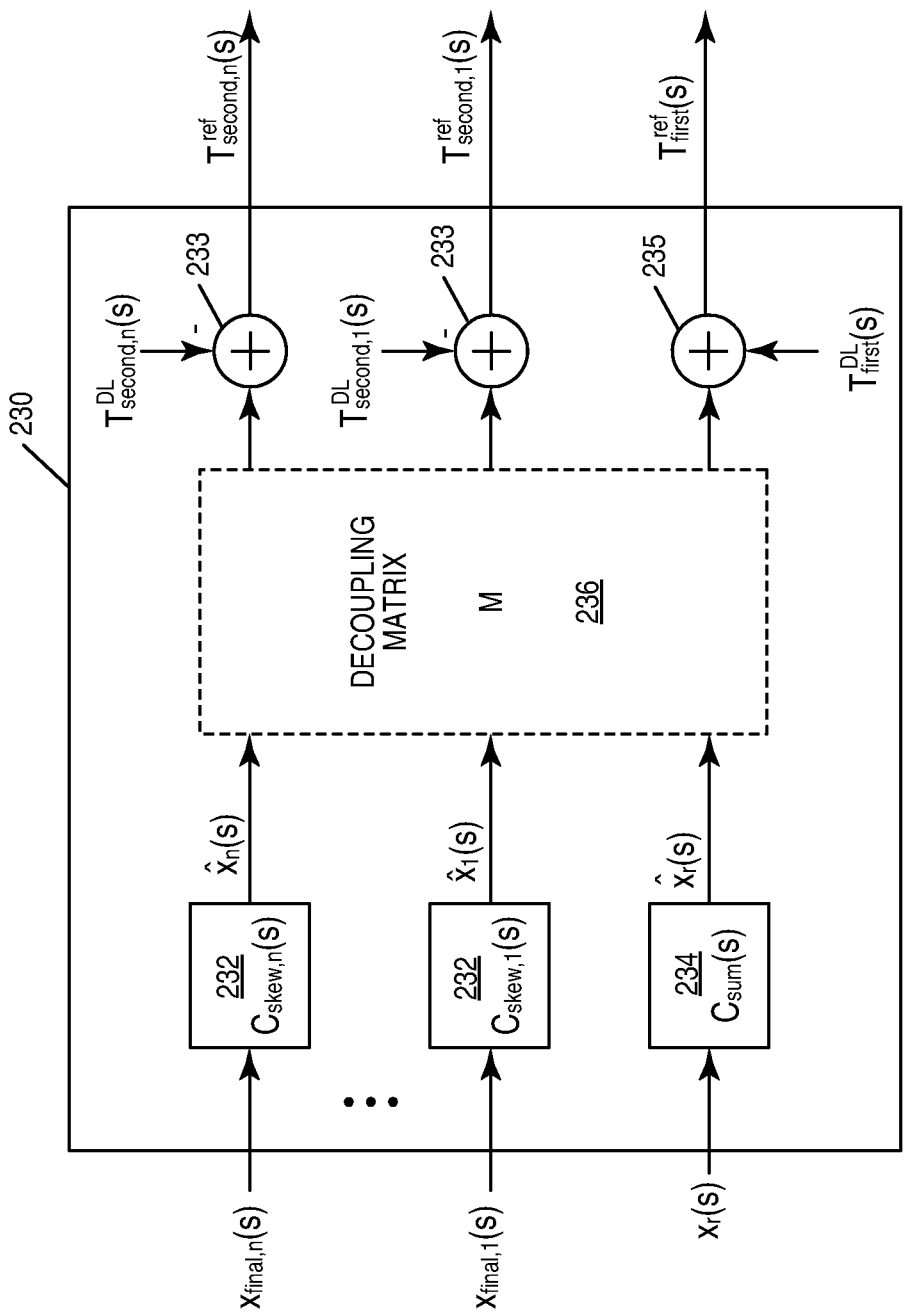
FIG. 8 shows a block diagram for the outer loop controller of the master node according to one exemplary embodiment.
Figure 9:
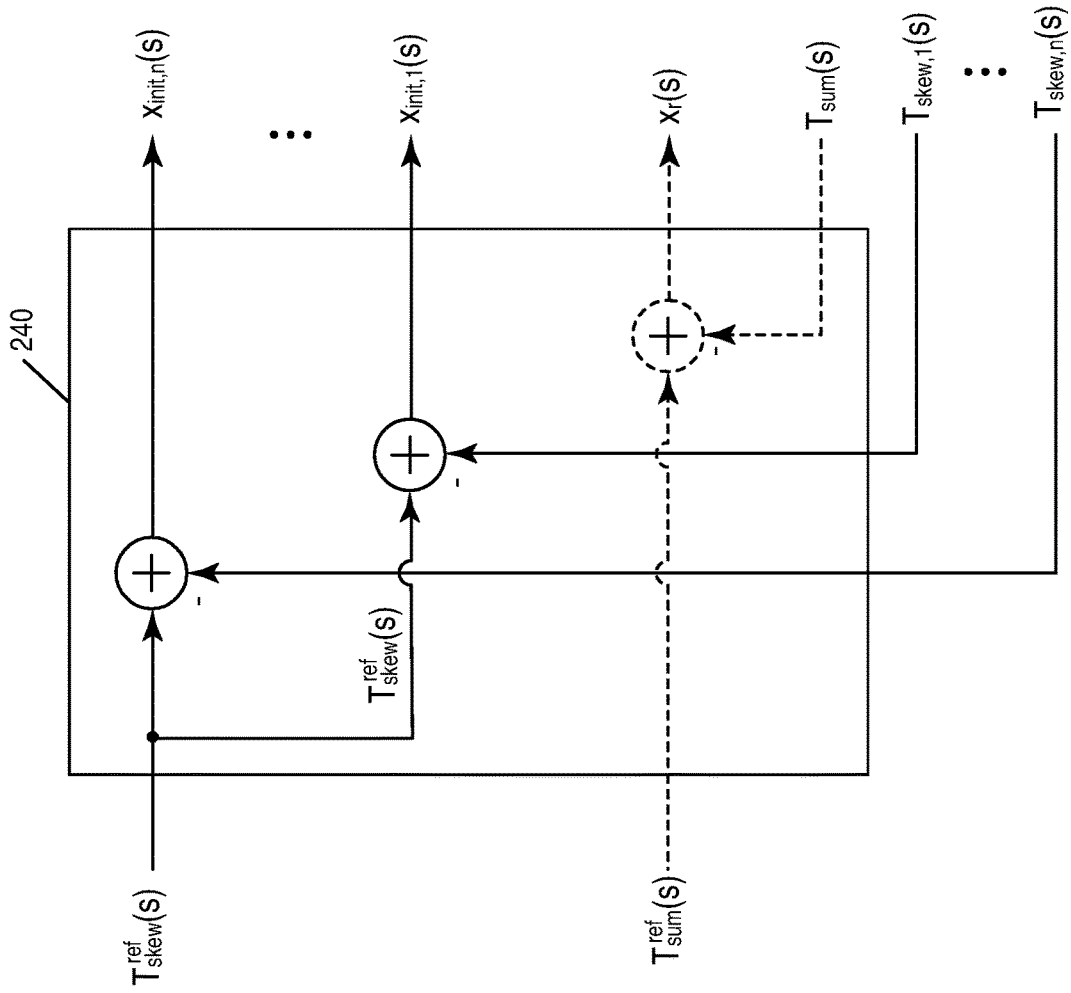
FIG. 9 shows a block diagram for the second combiner of the master node according to one exemplary embodiment.

FIG. 6 shows a general block diagram for the control of a multi-point transmission system comprising the master node 200 and the first and second slave nodes 300 according to the method 500 of FIG. 5. FIGS. 7-9 show more detailed block diagrams of the master node components. The shaded box in FIG. 6 represents the inner feedback loop 400 of the system, which has circuit elements in both the master and slave nodes, as shown in FIG. 4. For simplicity, FIG. 6 shows inner feedback loop 400 essentially as an interface between the master and slave nodes 200, 300. It will be appreciated that one or more elements of the master node 200 and one or more elements of each slave node 300 may be part of the inner feedback loop 400, e.g., as shown in FIG. 4. FIG. 6 also shows the outer feedback loop, where the following describes this system for i=1, . . . , n second transmission points (e.g., second slave nodes 300), for one reference transmission point r (e.g., the first slave node 300), and for one bearer. It will be appreciated, however, that one skilled in the art may easily extend the solution presented herein to more than one bearer, e.g., aggregates of bearers, where a bearer represents the support for a flow of data packets, and typically belongs to an IP connection.

The slave nodes 300, including the first slave node 300, perform the wireless transmissions to the receiver, e.g., the mobile device (not shown). Thus, each slave node 300 represents one transmission point in the multi-point system. As shown in FIG. 6, each slave node 300 includes an interface 310, a transmit queue 320, a processor 330 and a combiner 340. Interface 310 receives data, where the received data has a data rate set by a data rate control signal $u_1$ (FIG. 4) derived by the master node 200 responsive to reference values $T_{first}^{ref}$, $T_{second,i}^{ref}$, where $T_{first}^{ref}$ represents the reference value for the first slave node 300 and $T_{second,i}^{ref}$ represents the reference value for the i=1, . . . , n remaining (second) slave nodes 300. These reference values are used for control of the inner feedback loop 400. The transmit queue 320, which may be part of interface 310 as shown in FIG. 6 or may comprise a hardware element separate from the interface 310, stores the received data. It will be appreciated that each slave node 300 transmits the data in the transmit queue 320 over a wireless interface, where there typically is one transmit queue for each bearer (e.g., for each IP connection between the data source and the end user). Each slave node 300 needs the transmit queue 320 because the radio channel is subject to rapid fading. Processor 330 generates a backhaul delay $T_{second,i}^{DL}$, $T_{first}^{DL}$, e.g., from detected time-stamped data and the reception of such time-stamped data, where $T_{first}^{DL}$ represents the backhaul delay for the first slave node 300 and $T_{second,i}^{DL}$ represents the backhaul delay for the i=1, . . . , n remaining (second) slave nodes 300. For example, processor 330 may generate the backhaul delay $T_{second,i}^{DL}$, $T_{first}^{DL}$ by determining the difference between the time of arrival of the time-stamped data and the actual time stamp (provided by the master node 200).

Processor 330 further estimates a queue delay $T_i$, $T_r$ for controlling against the reference values $T_{first}^{ref}$, $T_{second,i}^{ref}$ responsive to the data rate control signal $u_1$ (FIG. 4), where $T_r$ represents the queue delay for the first slave node 300 and $T_i$ represents the queue delay for the i=1, . . . , n remaining (second) slave nodes 300. As used herein, the queue delay $T_i$, $T_r$ represents the amount of time the received data is stored in the corresponding transmit queue 320. Accordingly, the processor 330 may estimate the queue delay $T_i$, $T_r$ by measuring the time elapsed from when a packet enters the corresponding transmit queue 320 and when it leaves the corresponding transmit queue 320. Alternatively, processor 330 may estimate the queue delay $T_i$, $T_r$ by computing the quotient between the data volume of the corresponding transmit queue 320 and the wireless data rate. In still another alternative, the processor 330 may estimate the queue delay $T_i$, $T_r$ by computing the quotient between the averages of the data volume and the wireless data rate.

A combiner 340 combines the backhaul delay $T_{second,i}^{DL}$, $T_{first}^{DL}$ with the corresponding queue delay $T_i$, $T_r$ to generate a slave node delay $T_i+T_{second,i}^{DL}$, $T_r+T_{first}^{DL}$, where $T_r+T_{first}^{DL}$ represents the slave node delay for the first slave node 300 and $T_i+T_{second,i}^{DL}$ represents the slave node delay for the i=1, . . . , n remaining slave nodes 300. Each slave node 300 provides its slave node delay $T_i+T_{second,i}^{DL}$, $T_r+T_{first}^{DL}$ to the master node 200, e.g., via a channel interface that may be represented by $e^{-sT_{first}^{UL}}$ for the first slave node 300 and by $e^{-sT_{second,i}^{UL}}$ for the i=1, . . . , n remaining (second) slave nodes 300. Here, the exponential is the well-known Laplace transform of the underlying interface delay. As a result, the channel interfaces provide a first delay $T_{first}$ from the first slave node 300 and a second delay $T_{second,i}$ from each of the i=1, . . . , n remaining (second) slave nodes 300 to the master node 200, where the first delay $T_{first}$ represents a transmission time between the master node 200 and the first slave node 300, and each of the second delays $T_{second,i}$ represents a transmission time between the master node 200 and the corresponding one of the i=1, . . . , n remaining (second) slave nodes 300. Each slave node 300 also provides its queue delay $T_i$, $T_r$ back to the master node 200, i.e., back to the portion of the inner feedback loop 400 associated with the master node 200 (FIG. 4).

For simplicity, the following describes the solution presented herein, as implemented by the master node, in terms of one master node 200 operatively coupled to two slave nodes 300, e.g., first and second slave nodes 300, via inner and outer feedback loops. Those skilled in the art will appreciate that the solution presented herein may easily be extended to more than two slave nodes, as shown in FIGS. 6-9. While FIGS. 6-9 use the subscript i=1, . . . , n to refer to the plurality of second slave nodes, the following generally drops this subscript to simplify the discussions. It will be appreciated that the following describes the function of the master node with respect to each of the second slave nodes 300.

As shown in FIG. 6, master node 200 includes an interface 210, a first combiner 220, an outer loop controller 230, a deadzone mapper 250, and a second combiner 240. Interface 210 obtains the first delay $T_{first}$ from the first slave node 300 and obtains the second delay $T_{second}$ from the second slave node 300. The first combiner 220 determines the difference between the second delay $T_{second}$ and the first delay $T_{first}$ to determine a skew timing $T_{skew}$ for the second slave node 300, e.g., as shown in FIG. 7. The second combiner 240 determines an initial timing error $x_{init}$ by determining a difference between a reference skew timing $T_{skew}^{ref}$ and the skew timing $T_{skew}$. As used herein, $T_{skew}^{ref}$ represents the reference value for the time skew, which may be 0 in some cases. It will be appreciated that the same reference skew timing $T_{skew}^{ref}$ is used to determine the difference for each of the second slave nodes 300.

The initial timing error $x_{init}$ is input to a deadzone mapper 250, which applies a deadzone mapping to the initial timing error $x_{init}$ to determine a final timing error $x_{final}$. The deadzone mapping, which is nonlinear, removes the control action when the initial timing error is already within a timing error range $[u_{min}, u_{max}]$. More particularly, the deadzone mapper 250 adjusts the initial timing error $x_{init}$ responsive to a comparison between the initial timing error $x_{init}$ and a timing error range, where the timing error range includes an upper limit $u_{max}$ and a lower limit $u_{min}$ used to bound the timing error range (i.e., $[u_{min}, u_{max}]$). In one exemplary embodiment, if the initial timing error $x_{init}$ is within the timing error range, e.g., if $u_{min} \leq x_{init} \leq u_{max}$, the deadzone mapper 250 outputs a zero (or near zero) as the final timing error $x_{final}$, e.g., $x_{final}=0$, to remove the control action. However, if the initial timing error $x_{init}$ is outside the timing error range, e.g., $x_{init}>u_{max}$, or $x_{init}<u_{min}$, the deadzone mapper 250 determines the final timing error $x_{final}$ using the initial timing error $x_{init}$ and either the upper limit $u_{max}$ or the lower limit $u_{min}$ to implement the control action. For example, the deadzone mapper 250 may subtract the upper limit $u_{max}$ from the initial timing error $x_{init}$ to determine the final timing error $x_{final}$ when the initial timing error $x_{init}$ exceeds the upper limit $u_{max}$, and the deadzone mapper 250 may subtract the lower limit $u_{min}$ from the initial timing error $x_{init}$ to determine the final timing error $x_{final}$ when the lower limit $u_{min}$ exceeds the initial timing error $x_{init}$.

The final timing error $x_{final}$ is input to the outer loop controller 230, which uses the final timing error $x_{final}$ to control the first and second delays. More particularly, the outer loop controller 230 determines a first reference value $T_{first}^{ref}$ responsive to the final timing error $x_{final}$ and a first backhaul delay $T_{first}^{DL}$ for the first channel 10 between the master node 200 and the first slave node 300, and determines a second reference value $T_{second}^{ref}$ responsive to the final timing error $x_{final}$ and a second backhaul delay $T_{second}^{DL}$ for the second channel 20 between the master node 200 and the second slave node 300. The outer loop controller 230 controls the first delay $T_{first}$ using the first reference value $T_{first}^{ref}$, and controls the second delay $T_{second}$ using the second reference value $T_{second}^{ref}$.

In one exemplary embodiment, a sum timing error $x_r$ may also be input to the outer loop controller 230. In this embodiment, the first combiner 220 determines a sum timing $T_{sum}$ from a sum of the first delay $T_{first}$ and the second delay $T_{second}$ and the second combiner 240 determines the sum timing error $x_r$ from a difference between a reference sum timing $T_{sum}^{ref}$ and the sum timing $T_{sum}$. In this embodiment, $T_{sum}^{ref}$ represents the reference value for the sum of downlink time delays. This reference sum delay $T_{sum}^{ref}$ allows regulation of the absolute latency of all of the paths, and thus addresses the ultra-lean requirements of 5G. For example, the reference sum delay $T_{sum}^{ref}$ may be increased to make sure data is available for transmission over all active links, which enables the system to potentially avoid dropping links in ultra-lean scenarios where control information is piggy-backed with the transmission. When the sum timing error $x_r$ is high enough, e.g., when the reference sum delay $T_{sum}^{ref}$ is high enough, the downlink delays of all links will be larger than the backhaul delays of the links. As a result, the transmit queues will have to add a delay, something that requires a non-zero data volume in all transmit queues. In any event, the outer loop controller 230 determines the first reference value $T_{first}^{ref}$ (used to control the first delay $T_{first}$) responsive to the final timing error $x_{final}$, the first backhaul delay $T_{first}^{DL}$, and the sum timing error $x_r$, and determines the second reference value $T_{second}^{ref}$ (used to control the second delay $T_{second}$) responsive to the final timing error $x_{final}$, the second backhaul delay $T_{second}^{DL}$, and the sum timing error $x_r$.

FIG. 8 shows a block diagram for one exemplary outer loop controller 230 for the master node 200, where the outer loop controller 230 uses the final timing error $x_{final}$ and the sum timing error $x_r$. In this embodiment, the outer loop controller 230 includes a skew filter 232 and a corresponding combiner 233, as well as a sum filter 234 and a corresponding combiner 235. Each skew filter 232 is configured to filter the final timing error $x_{final}$ to generate a filtered timing error $\hat{x}$ according to a transfer function for the control channel of the corresponding second slave node 300. Similarly, the sum filter 234 filters the sum timing error $x_r$ according to a transfer function for the delay sum channel to generate a filtered sum timing error $\hat{x}_r$. To that end, each skew filter 232 filters the final timing error $x_{final}$ using $C_{skew}$, while the sum filter 234 filters the sum timing error $x_r$ using $C_{sum}$. As noted herein, the outer loop controller 230 uses the sum timing error $x_r$ and the corresponding sum filter 234 to make sure data is available for transmission over all active links, which prevents a potential data starvation problem anticipated with ultra-lean transmissions. The outer loop controller 230 then determines each of the second reference values $T_{second}^{ref}$ using the corresponding filtered timing error $\hat{x}$, and determines the first reference value $T_{first}^{ref}$ using the filtered sum timing error $\hat{x}_r$. For example, each combiner 233 may generate the second reference value $T_{second}^{ref}$ by combining the filtered timing error $\hat{x}$ with the corresponding backhaul delay $T_{second}^{DL}$. It will be appreciated that while in some embodiments the filters 232, 234 comprise linear filters, such is not required. Thus, one or more of the filters 232, 234 may comprise more advanced non-linear filters.

As shown in FIG. 6, each loop that controls the skew timing depends on the skew timings from all other control loops. Such coupling may complicate the controller design and/or reduce performance. To address this, the outer loop controller 230 may optionally include a decoupling circuit/module 236 that applies a decoupling matrix M to the input filtered signals. The decoupling matrix M is configured to decouple the skew timings and reference values, and may be derived from a computation of the sum and skew timings. Consider the following, which represents the matrix relationship between $x_{final}$ and $x_r$, and $T_{skew,i}$ and $T_{sum}$.

$$\begin{pmatrix} T_{sum}(s) \\ T_{skew,1}(s) \\ \vdots \\ T_{skew,n}(s) \end{pmatrix} = FD^{UL}(s)G(s)\left(MC(s)\begin{pmatrix} x_r(s) \\ x_{final,1}(s) \\ \vdots \\ x_{final,n}(s) \end{pmatrix} - D^{DL}(s)\right), \quad (11)$$

where F represents a matrix describing the computation of the sum and skew timings, $D^{UL}$ represents the diagonal matrix of uplink delay operators, $D^{DL}$ represents the vector of Laplace transformed downlink delays (not delay operators), G represents the diagonal matrix of downlink inner loop transfer functions, and C represents the diagonal matrix of controller filters. Neglecting backhaul delays and assuming perfect inner loops, e.g., G(s)=I, where I represents the identity matrix, Equation (11) may be simplified to $$\begin{pmatrix} T_{sum}(s) \\ T_{skew,1}(s) \\ \vdots \\ T_{skew,n}(s) \end{pmatrix} = FMC(s)\begin{pmatrix} x_r(s) \\ x_{final,1}(s) \\ \vdots \\ x_{final,n}(s) \end{pmatrix}. \quad (12)$$

Equation (12) indicates that static disturbance decoupling should exploit the relationship FM=I, and thus that $M=F^{-1}$. Using FIG. 6, it will be appreciated that F may be represented by:

$$F = \begin{pmatrix} 1 & 1 & \cdots & \cdots & 1 \\ -1 & 1 & 0 & \cdots & 0 \\ -1 & 0 & 1 & \ddots & \vdots \\ \vdots & & & \ddots & 0 \\ -1 & 0 & \cdots & 0 & 1 \end{pmatrix}. \quad (13)$$

Inverting F therefore produces the decoupling matrix M, which is represented by:

$$M = \frac{1}{n}\begin{pmatrix} 1 & -1 & \cdots & \cdots & -1 \\ 1 & n-1 & -1 & \cdots & -1 \\ 1 & -1 & n-1 & \ddots & \vdots \\ \vdots & & & \ddots & -1 \\ 1 & -1 & \cdots & -1 & n-1 \end{pmatrix}. \quad (14)$$

Outer loop controller 230 may therefore apply the decoupling matrix M of Equation (14) to the $x_{final}$ and $x_r$ signals to decouple the sum and skew timings.

Figure 10:
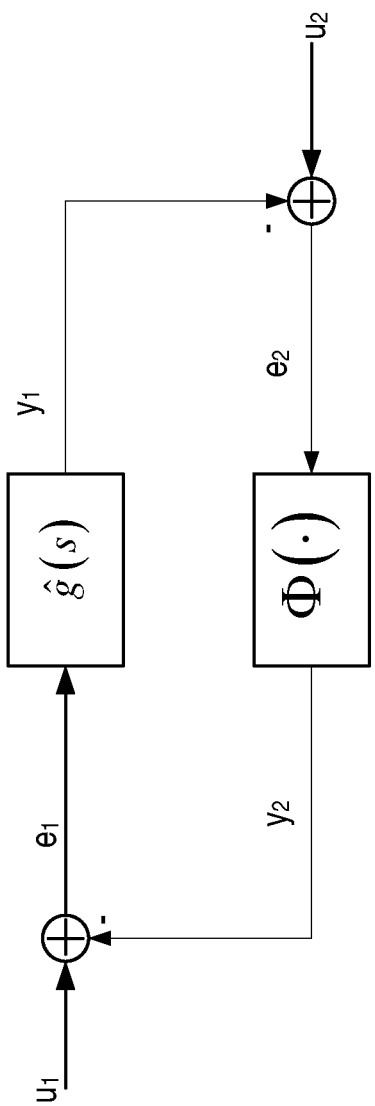
FIG. 10 shows a simple feedback control diagram according to the Popov criterion.

Some embodiments of the master node 200 presented herein may also control a stability of the inner and outer feedback loops according to a Popov criterion. To further explain this embodiment, the following first generally explains the Popov criterion with respect to FIG. 10. In FIG. 10, $\hat{g}(s)$ denotes the loop gain, $\Phi(\cdot)$ represents the static nonlinearity, $u_1$ and $u_2$ represent external signals impacting the feedback system, $e_1$ and $e_2$ represent internal error signals, and $y_1$ and $y_2$ represent internal signals. Assuming $u_1$, $u_2$, and $du_2/dt$ belong to $L_2$ and assuming $\hat{g}(j\omega) \to 0$, the Popov criterion states the feedback system (of FIG. 10) is $L_2$-stable if there exists a q>0 such that:

$$Re[(1+jq\omega)\hat{g}(j\omega)] + \frac{1}{k} > 0 \quad (15)$$

for all $\omega \geq 0$, where k represents the maximum slope of the static nonlinearity $\Phi(\cdot)$ that fulfils the sector condition of $0 \leq \sigma\Phi(\sigma) \leq k\sigma^2$. Further information regarding the Popov criterion and $L_2$ stability may be provided by "Nonlinear Systems Analysis" by M. Vidyasagar, chapter 6.7, Prentice Hall, 1978, which is incorporated by reference herein.

In one embodiment, the solution presented herein also uses the Popov criterion to guarantee the stability of the inner and outer feedback loops. For example, one or more control filters associated with a loop gain of the inner and outer feedback loops may be configured to satisfy the Popov criterion, as discussed further below, where the outer feedback loop is responsive to a maximum slope of the deadzone mapping. Such control may, for example, be accomplished by configuring the filter(s) responsive to the maximum slope of the deadzone mapping relative to a transfer function representing the inner and outer feedback loops. To achieve such control, the solution of FIG. 6 is first transformed into the block diagram of FIG. 10, for which the Popov criterion is valid. Once the loop gain $\hat{g}(s)$ of the resulting transformed block diagram is computed, the Popov criterion may be applied to provide the desired stability.

An inspection of FIGS. 10 and 6 reveals that the loop gain $\hat{g}(s)$ may be computed without a direct transformation by computation of the transfer function from the signal between the deadzone mapper 250 and the skew filter 232, to the first combiner 220, which may be represented by:

$$\hat{g}(s) = A_{11}(s)\frac{A_{12}(s)A_{21}(s)}{1+A_{22}(s)} \quad (16)$$

$$A_{11}(s) = \frac{1}{2}C_{skew}(s)\left(G_{2nd}(s)e^{-sT_{2nd}^{UL}} + G_{1st}(s)e^{-sT_{1st}^{UL}}\right)$$

$$A_{12}(s) = \frac{1}{2}C_{sum}(s)\left(G_{2nd}(s)e^{-sT_{2nd}^{UL}} - G_{1st}(s)e^{-sT_{1st}^{UL}}\right)$$

$$A_{21}(s) = \frac{1}{2}C_{skew}(s)\left(G_{2nd}(s)e^{-sT_{2nd}^{UL}} - G_{1st}(s)e^{-sT_{1st}^{UL}}\right)$$

$$A_{22}(s) = \frac{1}{2}C_{sum}(s)\left(G_{2nd}(s)e^{-sT_{2nd}^{UL}} + G_{1st}(s)e^{-sT_{1st}^{UL}}\right)$$

where $G_{2nd}(s)$ represents the transfer function used to model the inner loop filter for the second slave node 300, $G_{1st}(s)$ represents the transfer function used to model the inner loop filter for the first slave node 300, $T_{1st}^{UL}$ represents the delay of the uplink feedback signaling from the first slave node 300, and $T_{2nd}^{UL}$ represents the delay of the uplink feedback signaling from the second slave node 300. Note that the dependence of the inner loop gain on $T_{first}^{DL}$ and $T_{second}^{DL}$ is hidden in $G_{1st}(s)$ and $G_{2nd}(s)$, respectively. Given Equation (16), the Popov criterion may be expressed as:

$$Re[(1+jq\omega)\hat{g}(j\omega)] > -1 \quad (17)$$

for all $\omega \geq 0$ and some $q \geq 0$. This follows because the maximum slope of the nonlinearity (i.e., of the deadzone mapping) for the system of FIG. 6 is 1. Thus, the skew and sum filters 232, 234 of the outer loop controller 230, which are associated with a control loop gain of the inner and outer feedback loops, may be configured to control the stability of the inner and outer feedback loops according to the Popov criterion, where the outer feedback loop is responsive to the maximum slope of the deadzone mapping. Equations (16) and (17) show that the Popov criterion may be used to control the stability of the outer feedback loop by configuring the skew and sum filters 232, 234 responsive to the maximum slope k of the deadzone mapping 250 relative to the transfer function representative of each of the inner and outer feedback loops. Thus, the solution presented herein shows how the stability of the system of FIG. 6 may be controlled by designing the skew and sum filters 232, 234 to fulfill Equation (17).

Additional embodiments of the solution presented herein may also include signaling messages, e.g., from each slave node 300 to the master node 200 or from the master node 200 to each slave node 300. Such signaling messages may provide an identity number of the corresponding slave node, a first bearer identity number, and a first information element including the corresponding first delay. In some embodiments, the signaling messages may further include a first time tag for measuring another delay, e.g., the uplink delay. For example, an inner loop interface from the master node 200 to the slave nodes 300 may include data items, e.g., packets sent with the data rate $u_i$. The inner loop interface from the master node 200 to at least some slave nodes 300 may also include a time stamp. For example, such an inner loop interface may provide an information element with a data packet with multiple optional fields, where the optional fields may include the time stamp, a bearer ID, a master node ID, and/or a slave node ID, and where the information elements carried over the interface 210 of FIG. 6 comprises the first and second delays $T_{first}, T_{second}$. The inner loop interface from the slave node 300 to the master node 200 may include, in one embodiment, an information element having one or more optional fields, e.g., for the queue time, bearer ID, slave node ID, wireless rate used for feedforward control and/or computation of a queue time, queue data volume (used for computation of a queue time), and/or master node ID. In one exemplary embodiment of the inner loop interface from the slave node 300 to the master node 200, the information element may include fields for the queue time, bearer ID, slave node ID, and master node ID. In another exemplary embodiment of the inner loop interface from the slave node 300 to the master node 200, the information element may include fields for the queue data volume, wireless rate used for computation of the queue time, bearer ID, slave node ID, and master node ID. For the outer loop signaling, a new interface number may be provided to the master node 200 that specifies the $e^{-sT_{first}^{UL}}$ and $e^{-sT_{second}^{UL}}$ interfaces, along with the slave node timing information, bearer ID, slave node ID, and master node ID.

Figure 11:
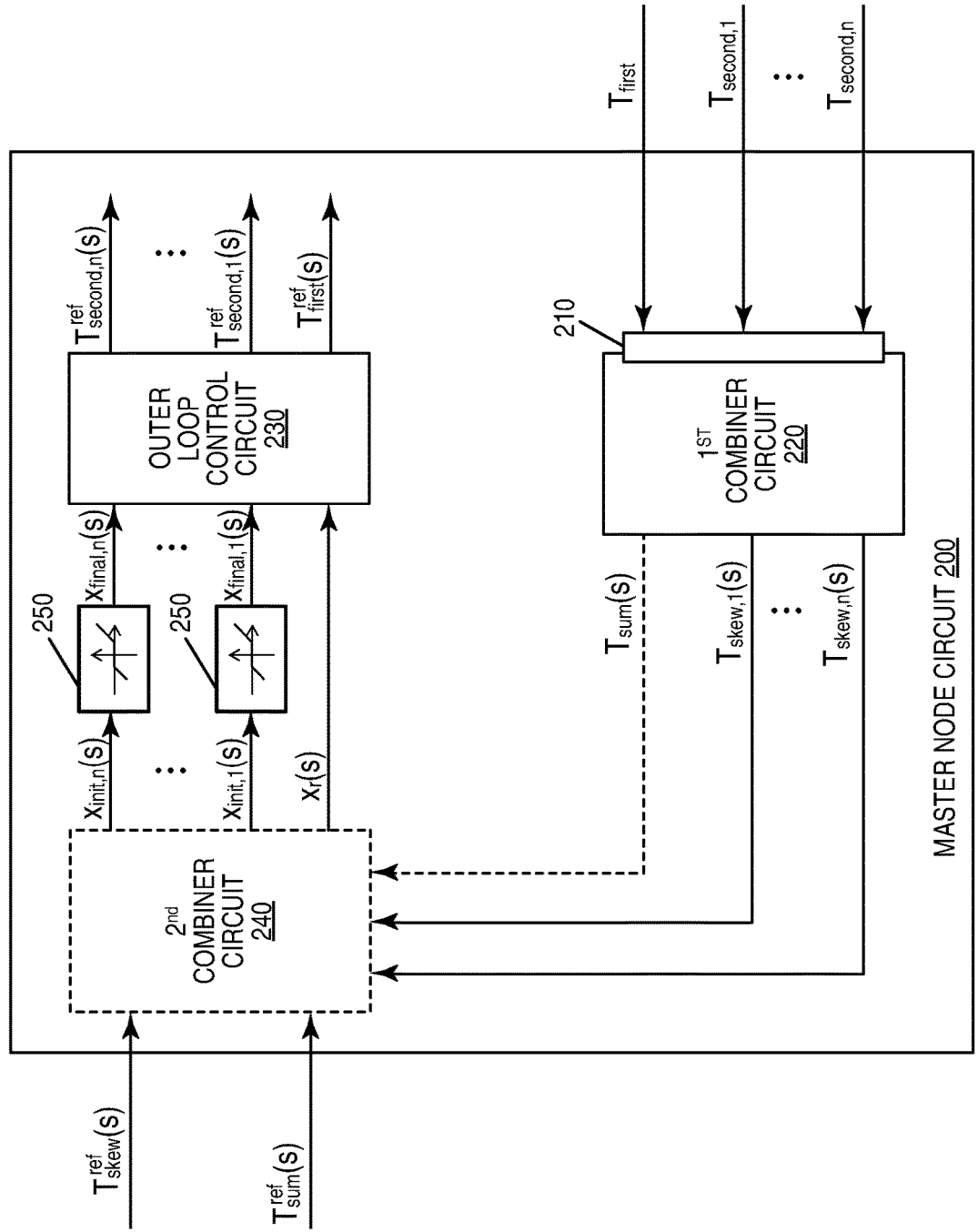
FIG. 11 shows a block diagram for an exemplary master node circuit.
Figure 13:
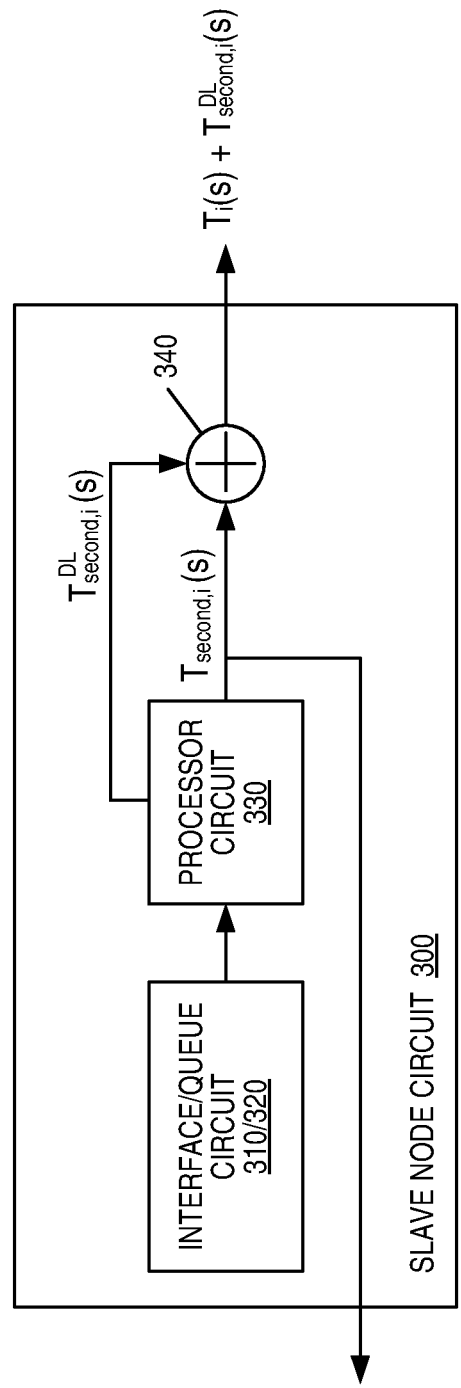
FIG. 13 shows a block diagram for an exemplary slave node circuit.

It will be appreciated that in some embodiments, various elements disclosed herein comprise some kind of circuit. For example, the interface, deadzone mapper, combiners, outer loop controller, transmit queue, processor, combining matrix, inner loop controller, and/or filter elements of the master and slave nodes 200, 300 may be implemented as, e.g., interface circuits, combiner circuits, deadzone mapping circuits, outer loop controller circuits, processing circuits, transmit queue circuits, combining matrix circuits, inner loop controller circuits, filter circuits, etc. As such, the master node 200 may comprise a master node circuit 200 comprising an interface circuit 210, a first combiner circuit 220, an outer loop controller circuit 230 (comprising filter circuits 232, 234, combiner circuits 233, 235, and an optional decoupling circuit 236), a second combiner circuit 240, and a deadzone mapping circuit 250, as shown in FIG. 11. Similarly, the slave node(s) 300 of FIG. 6 may comprise a slave node circuit 300 comprising an interface circuit 310, transmit queue circuits 320, processing circuits 330, and combining circuits 340, as shown in FIG. 13. Each of these circuits may be embodied in hardware and/or in software (including firmware, resident software, microcode, etc.) executed on a controller or processor, including an application specific integrated circuit (ASIC).

Figure 12:
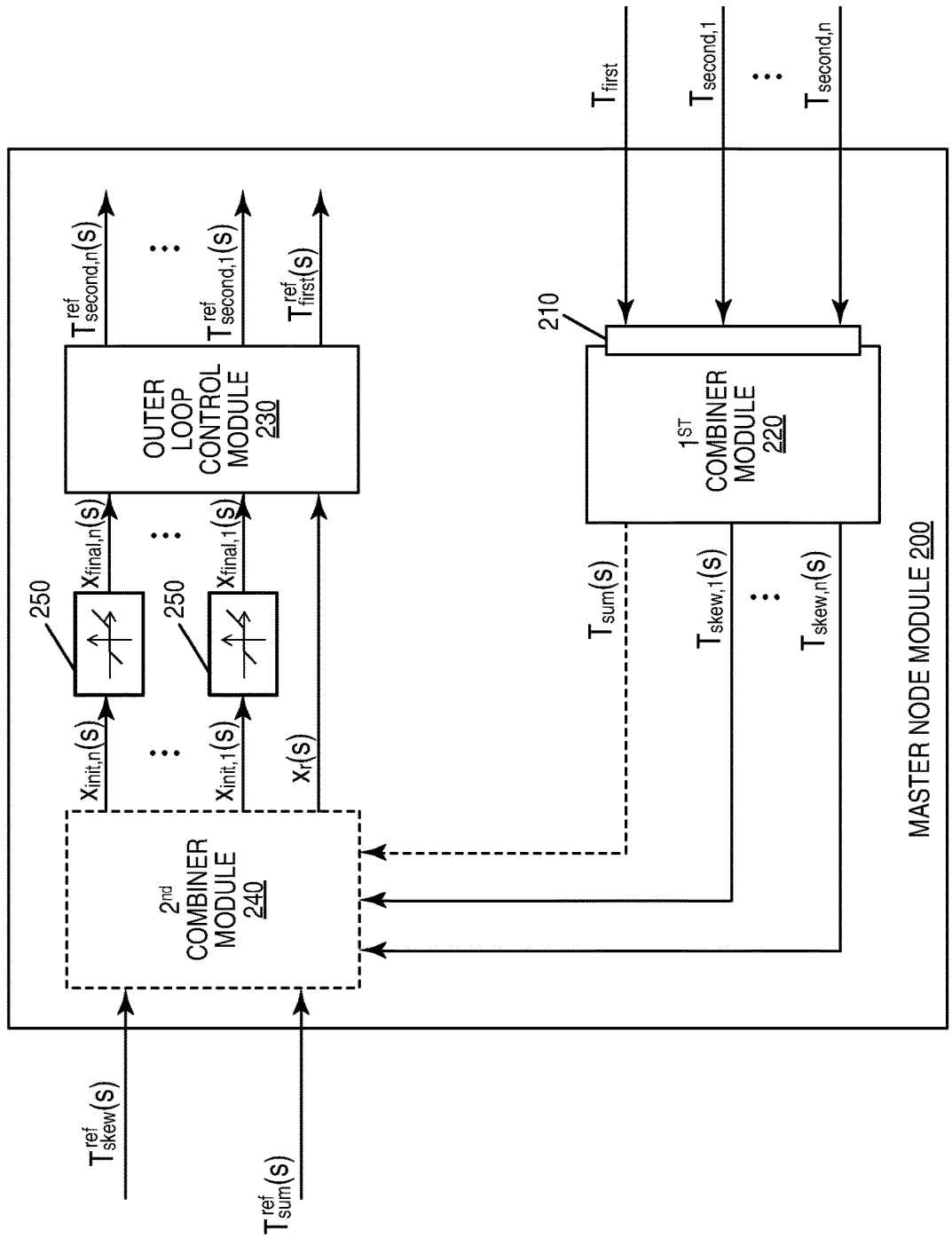
FIG. 12 shows a block diagram for an exemplary master node module.
Figure 14:
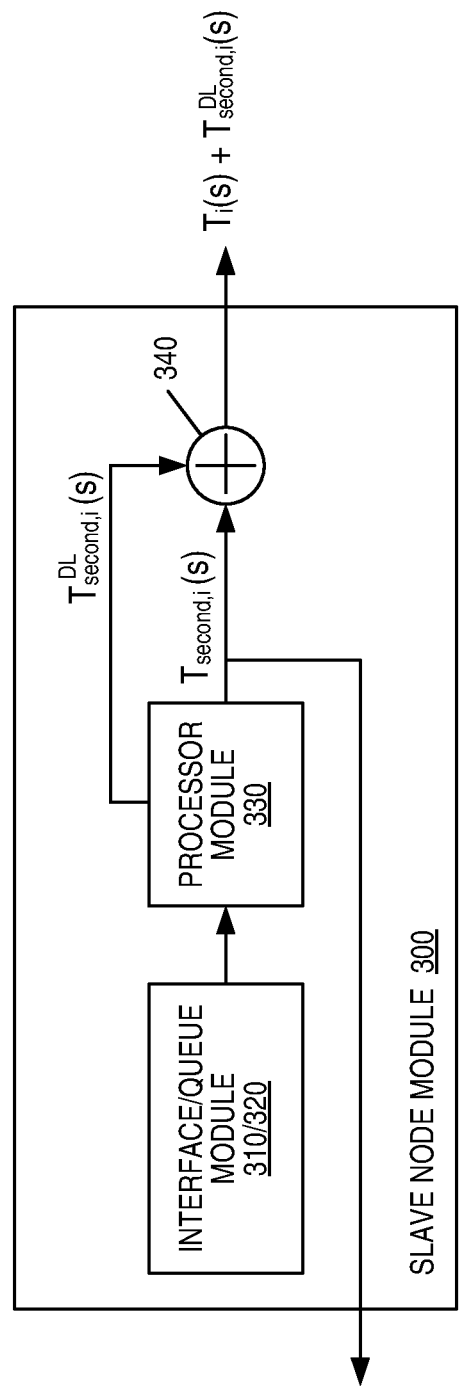
FIG. 14 shows a block diagram for an exemplary slave node module.

It will also be appreciated that in other embodiments, various elements disclosed herein comprise some kind of module configured to execute the described function. For example, the interface, combiner, deadzone mapper, outer loop controller, transmit queue, processor, combining matrix, inner loop controller and/or filter elements of the master and slave nodes 200, 300 may be implemented as, e.g., interface modules, combiner modules, deadzone mapping modules, outer loop controller modules, processing modules, transmit queue modules, combining matrix modules, inner loop controller modules, filter modules, etc. As such, the master node 200 may comprise a master node module 200 configured to execute the method 500 of FIG. 5, where the master node module 200 comprises an interface module 210, a first combiner module 220, an outer loop controller module 230 (comprising filter modules 232, 234, combiner modules 233, 235, and an optional decoupling module 236), a second combiner module 240, and deadzone mapping modules, as shown in FIG. 12. Similarly, the slave node(s) 300 of FIG. 6 may comprise a slave node module 300 comprising an interface module 310, transmit queue module 320, processing module 330, and combining module 340, as shown in FIG. 14.

Figure 15A:
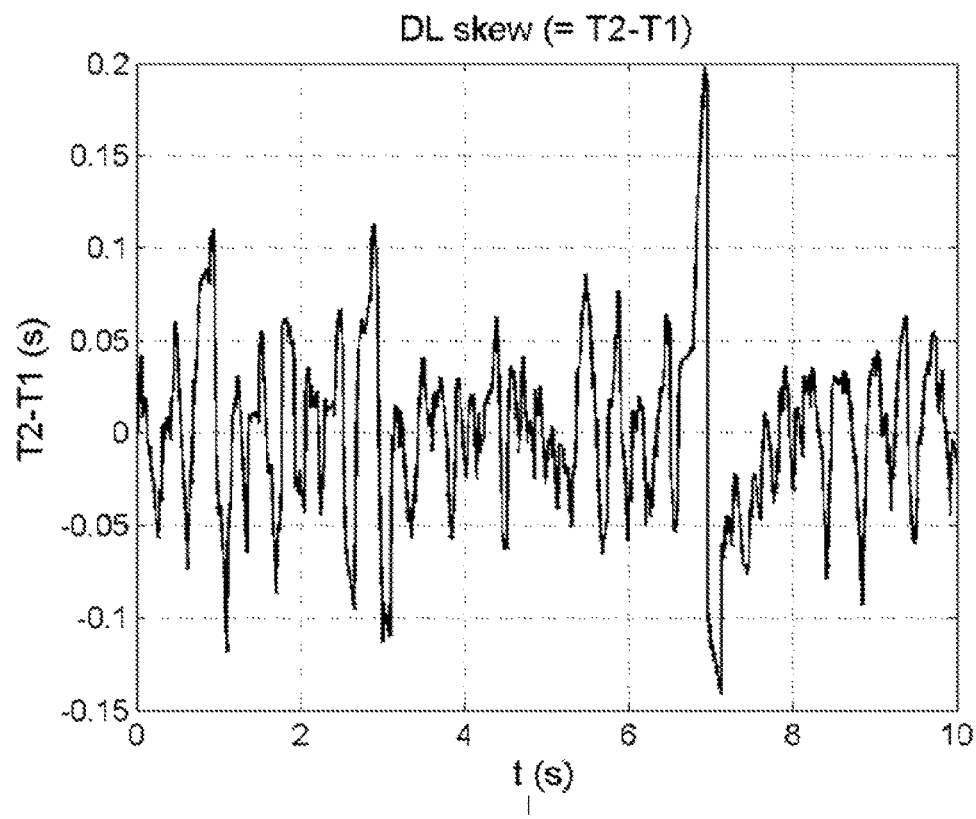
FIGS. 15A-15D show simulation results of the closed-loop control system with and without the deadzone mapping of the solution presented herein.
Figure 15C:
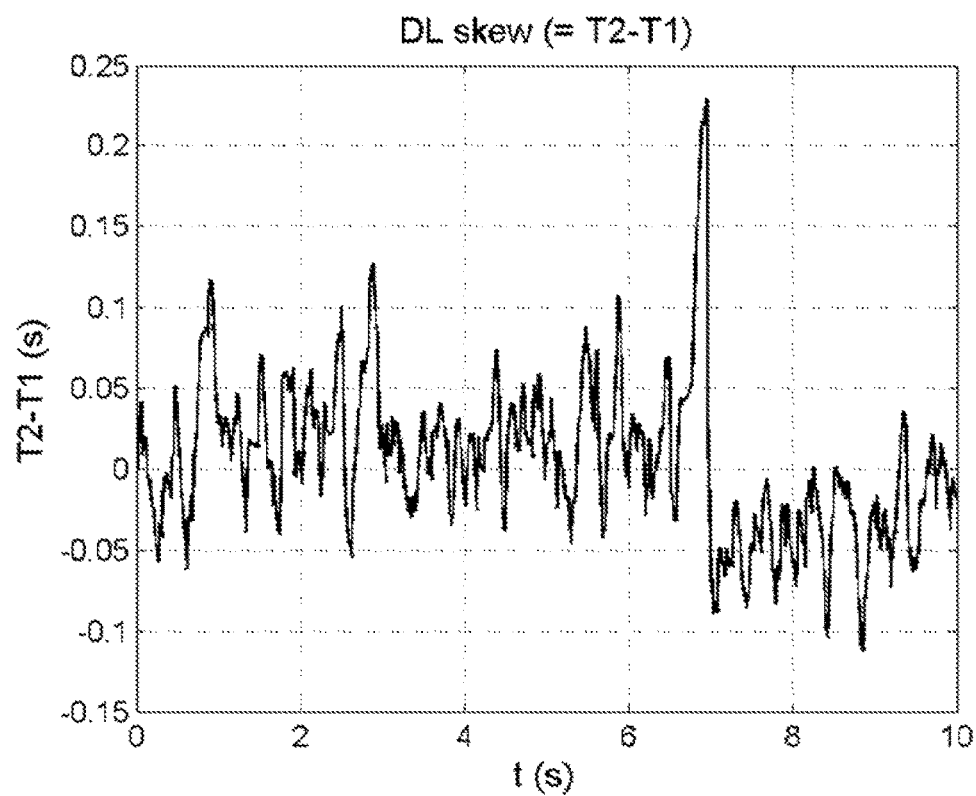
Figure 15B:
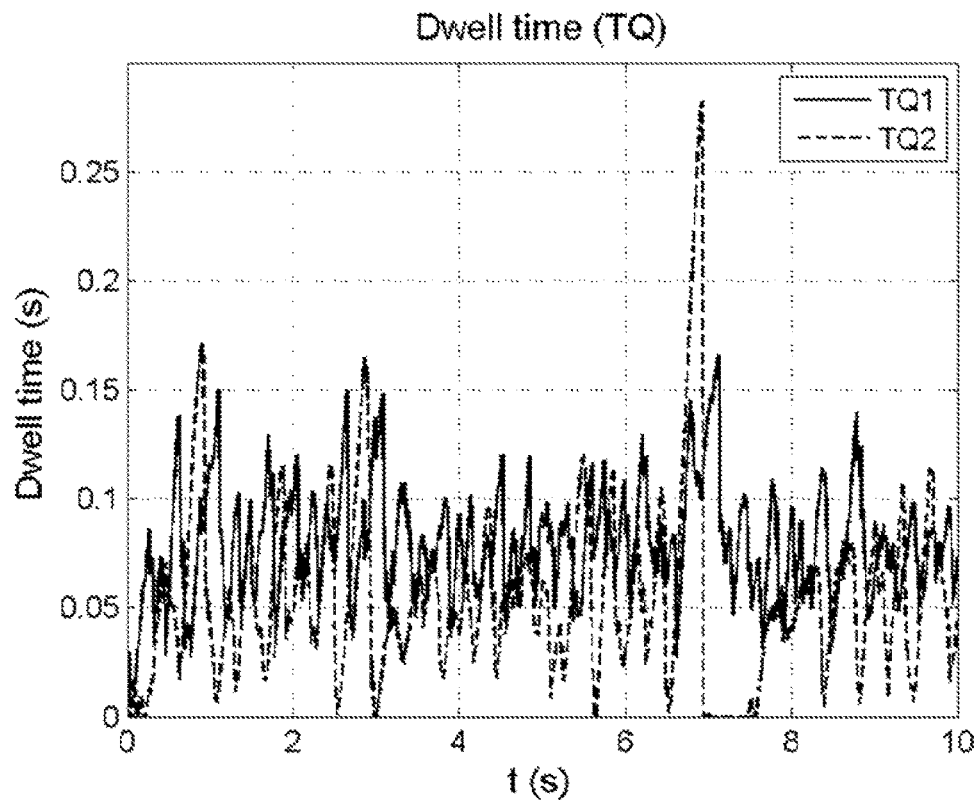
Figure 15D:
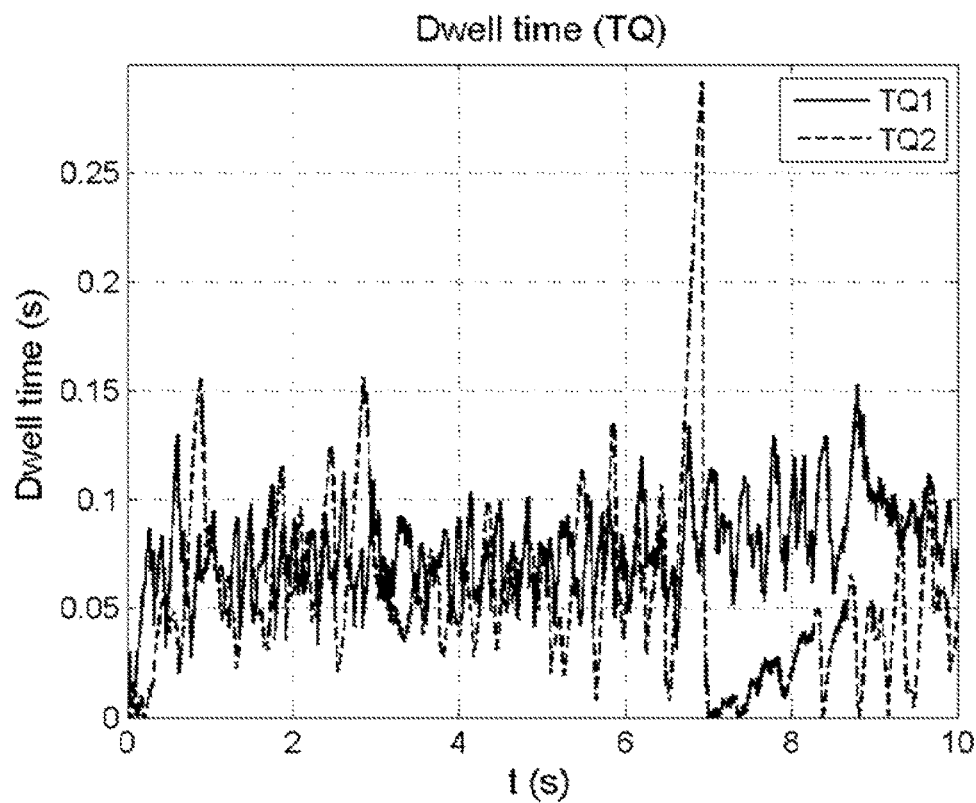

By using interval time difference flow control (e.g., via the deadzone mapper), the solution presented herein provides improved 4G and 5G multipoint flow control. In particular, the solution presented herein reduces end-to-end latency for selected traffic types, and thus enhances capacity (for any number of transmission points), and guarantees the stability of the feedback control system. FIGS. 15A-15D demonstrate the improvements provided by the solution presented herein. FIGS. 15A and 15B respectively show the time skew $T_{skew}$ and the dwell times of the queues of the first and second slave nodes 300 without the deadzone mapping disclosed herein, while FIGS. 15C and 15D respectively show $T_{skew}$ and the dwell times with the deadzone mapping disclosed herein (e.g., a ±100 ms deadzone). As can be seen from the 7 s time mark, the skew changes to a negative mean in the deadzone case (FIG. 15C). This avoids the need for the dwell time to be reduced to zero right after the 7 s mark in the deadzone case (FIG. 15D), as it is for the non-deadzone case. The result is a higher amount of data starvation in the non-deadzone case (FIG. 15B). Thus, FIGS. 15A-D illustrate the effect of the solution presented herein.

The solution presented herein may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

What is claimed is:

1. A method implemented in a master node of controlling a transmission timing for a plurality of slave nodes in a communication network, the method comprising:

determining a skew timing ($T_{skew}$) from a difference between a second delay ($T_{second}$) and a first delay ($T_{first}$), wherein the first delay ($T_{first}$) represents a transmission time between the master node and a first slave node (300), and wherein the second delay ($T_{second}$) represents a transmission time between the master node and a second slave node;

determining an initial timing error ($x_{init}$) from a difference between a reference skew timing ($T_{skew}^{ref}$) and the skew timing ($T_{skew}$);

applying a deadzone mapping to the initial timing error ($x_{init}$) to determine a final timing error ($x_{final}$), wherein the deadzone mapping is configured to adjust the initial timing error ($x_{init}$) responsive to a comparison between the initial timing error ($x_{init}$) and a timing error range, said timing error range including an upper limit ($u_{max}$) and a lower limit ($u_{min}$) used to bound the timing error range; and controlling the first delay ($T_{first}$) and the second delay ($T_{second}$) using the final timing error ($x_{final}$) to keep the skew timing ($T_{skew}$) within the timing error range.

2. A master node in communication with a plurality of slave nodes of a communication network, the master node comprising:

a first combiner circuit configured to determine a skew timing ($T_{skew}$) from a difference between a second delay ($T_{second}$) and a first delay ($T_{first}$), wherein the first delay ($T_{first}$) represents a transmission time between the master node and a first slave node, and wherein the second delay ($T_{second}$) represents a transmission time between the master node and a second slave node);

a second combiner circuit (240) configured to determine an initial timing error ($x_{init}$) from a difference between a reference skew timing ($T_{skew}^{ref}$) and the skew timing ($T_{skew}$);

a deadzone mapping circuit configured to adjust the initial timing error ($x_{init}$) to determine a final timing error ($x_{final}$) responsive to a comparison between the initial timing error ($x_{init}$) and a timing error range, said timing error range including an upper limit ($u_{max}$) and a lower limit ($u_{min}$) used to bound the timing error range; and an outer loop control circuit configured to control the first delay ($T_{first}$) and the second delay ($T_{second}$) using the final timing error ($x_{final}$) to keep the skew timing ($T_{skew}$) within the timing error range.

3. The master node of claim 2 wherein the deadzone mapping circuit is configured to determine the final timing error ($x_{final}$) by:

comparing the initial timing error ($x_{init}$) to at least one of the upper and lower limits of the timing error range;

if the initial timing error ($x_{init}$) is within the timing error range, setting the final timing error ($x_{final}$) to zero; and if the initial timing error ($x_{init}$) is outside the timing error range, determining the final timing error ($x_{final}$) using the initial timing error ($x_{init}$) and one of the upper and lower limits.

4. The master node of claim 3 wherein the deadzone mapping circuit is configured to determine the final timing error ($x_{final}$) when the initial timing error ($x_{init}$) is outside the timing error range by:

subtracting the upper limit ($u_{max}$) from the initial timing error ($x_{init}$) to determine the final timing error ($x_{final}$) when the initial timing error ($x_{init}$) exceeds the upper limit ($u_{max}$); and subtracting the lower limit ($u_{min}$) from the initial timing error ($x_{init}$) to determine the final timing error ($x_{final}$) when the lower limit ($u_{min}$) exceeds the initial timing error ($x_{init}$).

5. The master node of claim 2 wherein the outer loop control circuit is configured to control the first delay ($T_{first}$) and the second delay ($T_{second}$) by:

determining a first reference value ($T_{first}^{ref}$) responsive to the final timing error ($x_{final}$) and a first backhaul delay ($T_{first}^{DL}$) for a first channel between the master node and the first slave node;

determining a second reference value ($T_{second}^{ref}$) responsive to the final timing error ($x_{final}$) and a second backhaul delay ($T_{second}^{DL}$) for a second channel between the master node and the second slave node;

controlling the first delay ($T_{first}$) using the first reference value ($T_{first}^{ref}$); and controlling the second delay ($T_{second}$) using the second reference value ($T_{second}^{ref}$).

6. The master node of claim 5 wherein:

the first combiner circuit is further configured to:

determine a sum timing ($T_{sum}$) from a sum of the first delay ($T_{first}$) and the second delay ($T_{second}$); and determine a sum timing error ($x_r$) from a difference between a reference sum timing ($T_{sum}^{ref}$) and the sum timing ($T_{sum}$);

the outer loop control circuit comprises:

a skew filter circuit configured for a control channel of the second slave node and configured to filter the final timing error ($x_{final}$) to generate a filtered timing error ($\hat{x}$);

a sum filter circuit configured for a delay sum channel and configured to filter the sum timing error ($x_r$) to generate a filtered sum timing error ($\hat{x}_r$);

a third combiner circuit configure to determine the second reference value ($T_{second}^{ref}$) from the filtered timing error ($\hat{x}$), the filtered sum timing error ($\hat{x}_r$), and the second backhaul delay ($T_{second}^{DL}$); and a fourth combiner circuit configured to determine the first reference value ($T_{first}^{ref}$) from the filtered sum timing error ($\hat{x}_r$), the filtered timing error ($\hat{x}$), and the first backhaul delay ($T_{first}^{DL}$).

7. The master node of claim 2 wherein the plurality of slave nodes are configured to transmit signals to a wireless terminal, and wherein the upper limit ($u_{max}$) and the lower limit ($u_{min}$) are derived based on a length of a buffer in the wireless terminal.

8. The master node of claim 2 wherein each slave node connects to the master node via an inner feedback loop and an outer feedback loop, and wherein the master node is further configured to control a stability of the inner and outer feedback loops according to a Popov criterion.

9. The master node of claim 8 wherein the master node controls the stability of the inner and outer feedback loops according to the Popov criterion by configuring one or more controller filters associated with a control loop gain of the inner and outer feedback loops, said outer feedback loop being responsive to a maximum slope of the deadzone mapping.

10. The master node of claim 2 wherein each slave node connects to the master node via an inner feedback loop and an outer feedback loop, and wherein the master node is further configured to control a stability of the outer feedback loop by configuring one or more controller filters associated with a control loop gain responsive to a maximum slope of the deadzone mapping relative to a transfer function representative of each of the inner and outer feedback loops according to a Popov criterion.

11. The master node of claim 10 wherein the master node is configured to control the stability of the outer feedback loop by satisfying:

$$\operatorname{Re}[(1+jq\omega)\hat{g}(\omega)] > -\frac{1}{k}$$

where q represents a number greater than zero, ω represents angular frequency, ĝ (ω) represents a collective loop gain for the inner and outer feedback loops, and k represents the maximum slope of the deadzone mapping.

12. The master node of claim 2 further comprising an interface circuit configured to:
receive the first delay ($T_{first}$) in a first signaling message comprising an identity number of the first slave node, a first bearer identity number, and a first information element including the first delay; and
receive the second delay ($T_{second}$) in a second signaling message comprising an identity number of the second slave node, a second bearer identity number, and a second information element including the second delay.

13. The master node of claim 2 further comprising an interface circuit configured to receive the first delay from the first slave node via an intermediate node.

14. The master node of claim 2 further comprising an interface circuit configured to receive the second delay from the second slave node via an intermediate node.

15. A computer program product stored in a non-transitory computer readable medium for controlling a transmission timing for a plurality of slave nodes in a communication network, the computer program product comprising software instructions which, when run on a processing circuit in the master node, causes the processing circuit to:
determine a skew timing ($T_{skew}$) from a difference between a second delay ($T_{second}$) and a first delay ($T_{first}$), wherein the first delay ($T_{first}$) represents a transmission time between the master node and a first slave node, and wherein the second delay ($T_{second}$) represents a transmission time between the master node and a second slave node;
determine an initial timing error ($x_{init}$) from a difference between a reference skew timing ($T_{skew}^{ref}$) and the skew timing ($T_{skew}$);
apply a deadzone mapping to the initial timing error ($x_{init}$) to determine a final timing error ($x_{final}$), wherein the deadzone mapping is configured to adjust the initial timing error ($x_{init}$) responsive to a comparison between the initial timing error ($x_{init}$) and a timing error range, said timing error range including an upper limit ($u_{max}$) and a lower limit ($u_{min}$) used to bound the timing error range; and
control the first delay ($T_{first}$) and the second delay ($T_{second}$) using the final timing error ($x_{final}$) to keep the skew timing ($T_{skew}$) within the timing error range.

* * * * *